US010375346B2

(12) United States Patent
Kaplan et al.

(10) Patent No.: US 10,375,346 B2
(45) Date of Patent: Aug. 6, 2019

(54) COMPONENT RACK FOR A DISPLAY

(71) Applicant: Leon Hand-Crafted Speakers, Inc., Ann Arbor, MI (US)

(72) Inventors: Noah D. Kaplan, Ann Arbor, MI (US); Robert Waissi, Ann Arbor, MI (US); Michael Fencil, Dearborn, MI (US); Bryn Morrison, Ann Arbor, MI (US); Ethan Kaplan, Ann Arbor, MI (US)

(73) Assignee: Leon Hand-Crafted Speakers, Inc., Ann Arbor, MI (US)

( * ) Notice: Subject to any disclaimer, the term of this patent is extended or adjusted under 35 U.S.C. 154(b) by 0 days.

(21) Appl. No.: 15/616,646

(22) Filed: Jun. 7, 2017

(65) Prior Publication Data

US 2017/0354054 A1   Dec. 7, 2017

Related U.S. Application Data

(60) Provisional application No. 62/346,901, filed on Jun. 7, 2016.

(51) Int. Cl.
*H05K 5/00* (2006.01)
*H05K 7/00* (2006.01)
*H04N 5/655* (2006.01)
*A47B 81/06* (2006.01)
*H04N 5/64* (2006.01)

(52) U.S. Cl.
CPC ............. *H04N 5/655* (2013.01); *A47B 81/06* (2013.01); *H04N 5/642* (2013.01)

(58) Field of Classification Search
CPC ...................................................... H05K 5/00

USPC .................................................... 361/679.21
See application file for complete search history.

(56) References Cited

U.S. PATENT DOCUMENTS

| 5,697,454 | A | * | 12/1997 | Wilcox | ............... | A01B 59/068 |
| | | | | | | 172/439 |
| 6,831,708 | B2 | | 12/2004 | Tajima | | |
| 6,847,411 | B2 | | 1/2005 | Pan et al. | | |
| 8,270,651 | B2 | * | 9/2012 | McCarty | ............... | H04N 5/64 |
| | | | | | | 181/150 |
| D669,883 | S | | 10/2012 | Cheng | | |
| 8,417,296 | B2 | | 4/2013 | Caballero et al. | | |
| 8,474,193 | B2 | | 7/2013 | Sutton et al. | | |
| D712,952 | S | | 9/2014 | Sumii et al. | | |
| D715,769 | S | | 10/2014 | McManigal | | |
| D716,756 | S | | 11/2014 | Kim et al. | | |
| D738,853 | S | | 9/2015 | Savage et al. | | |
| 9,167,326 | B2 | | 10/2015 | Hardiman et al. | | |
| D745,488 | S | | 12/2015 | Lee et al. | | |

(Continued)

FOREIGN PATENT DOCUMENTS

CN     202838410 U     3/2013
CN     203747915 U     7/2014
(Continued)

*Primary Examiner* — Jerry Wu
(74) *Attorney, Agent, or Firm* — Bejin Bieneman PLC

(57) ABSTRACT

A component rack for a display that includes: a frame, that includes: a base, a first wall, and a second wall arranged to form a U-shaped cavity; and a plurality of component modules located within the cavity and adapted to be coupled to the frame, wherein the frame and an inboard side of each of the plurality of component modules define an electronics chamber region, wherein the frame is adapted to carry modular electronic devices.

19 Claims, 14 Drawing Sheets

(56) References Cited

U.S. PATENT DOCUMENTS

| | | |
|---|---|---|
| 2007/0154041 A1 | 7/2007 | Beauchamp |
| 2010/0026912 A1 | 2/2010 | Ho et al. |
| 2010/0104124 A1* | 4/2010 | Abraham ............... H04R 1/028 381/333 |
| 2013/0306399 A1 | 11/2013 | Swan et al. |
| 2014/0294215 A1 | 10/2014 | Caldes |
| 2014/0355805 A1 | 12/2014 | Park et al. |
| 2015/0271584 A1 | 9/2015 | Black et al. |

FOREIGN PATENT DOCUMENTS

| | | |
|---|---|---|
| CN | 203896492 U | 10/2014 |
| CN | 204145684 U | 2/2015 |
| CN | 204517945 U | 7/2015 |
| EP | 1595474 A1 | 11/2005 |
| GB | 2467735 A | 8/2010 |
| WO | 2009063216 A1 | 5/2009 |
| WO | 2013103290 A1 | 7/2013 |

* cited by examiner

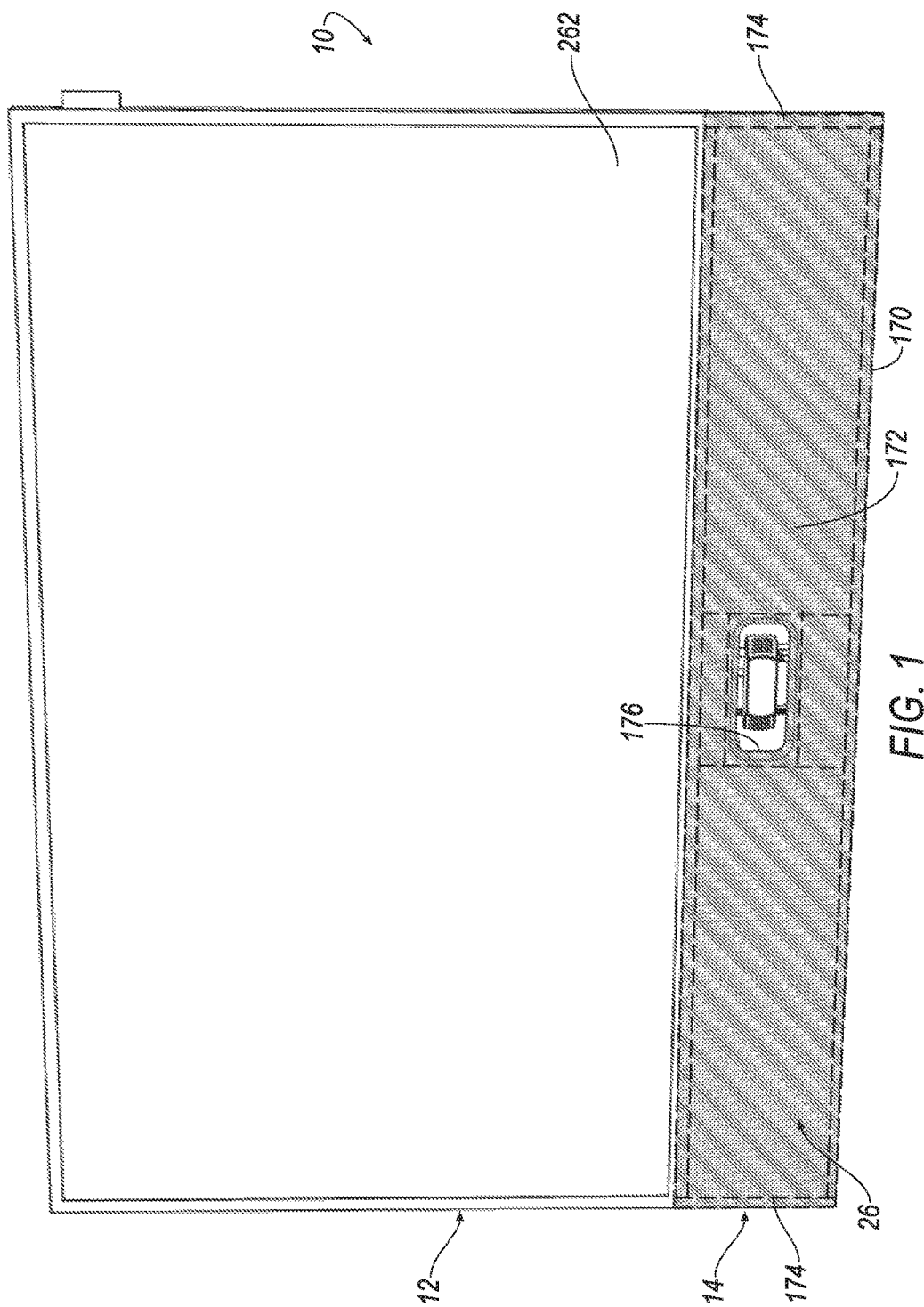

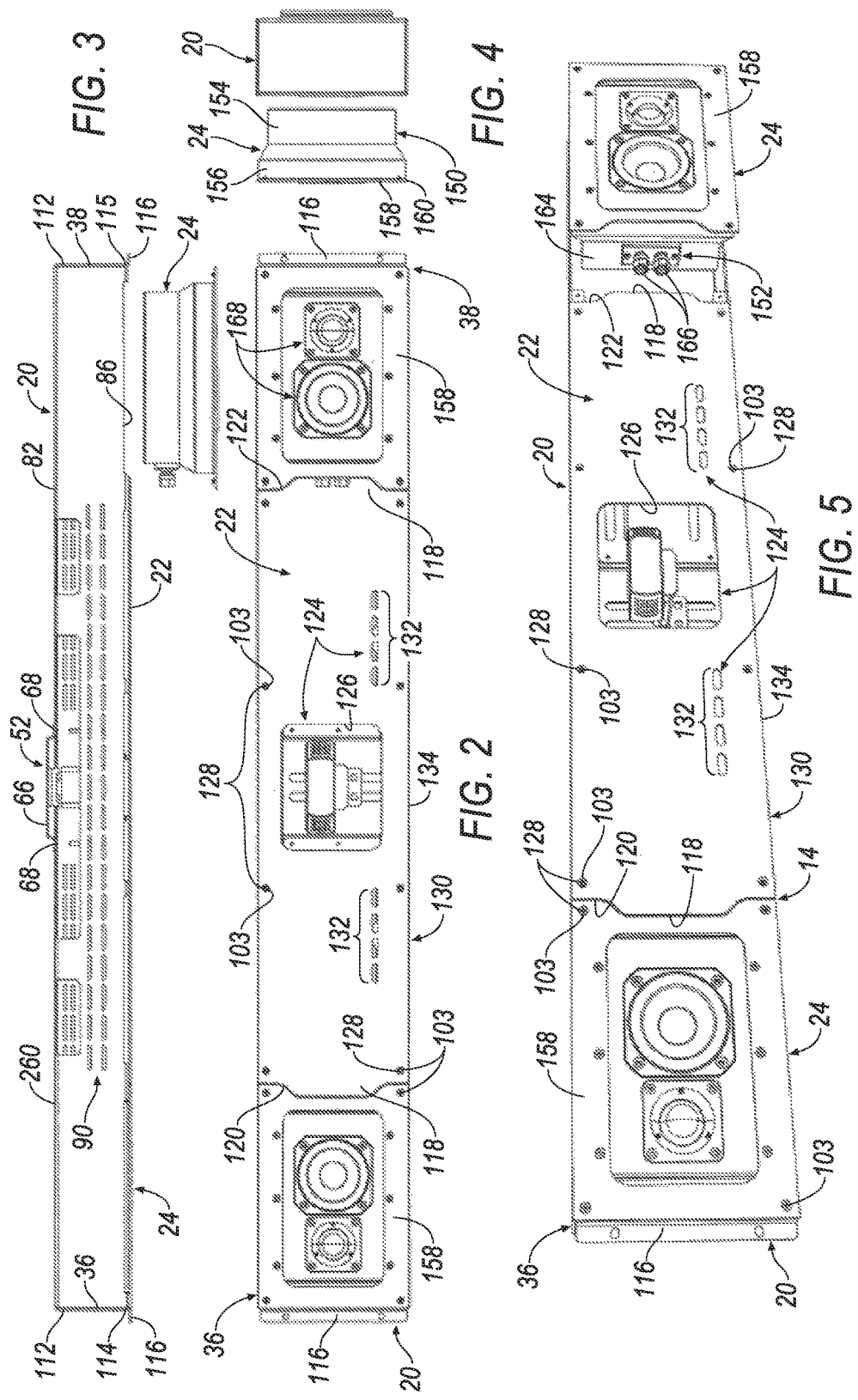

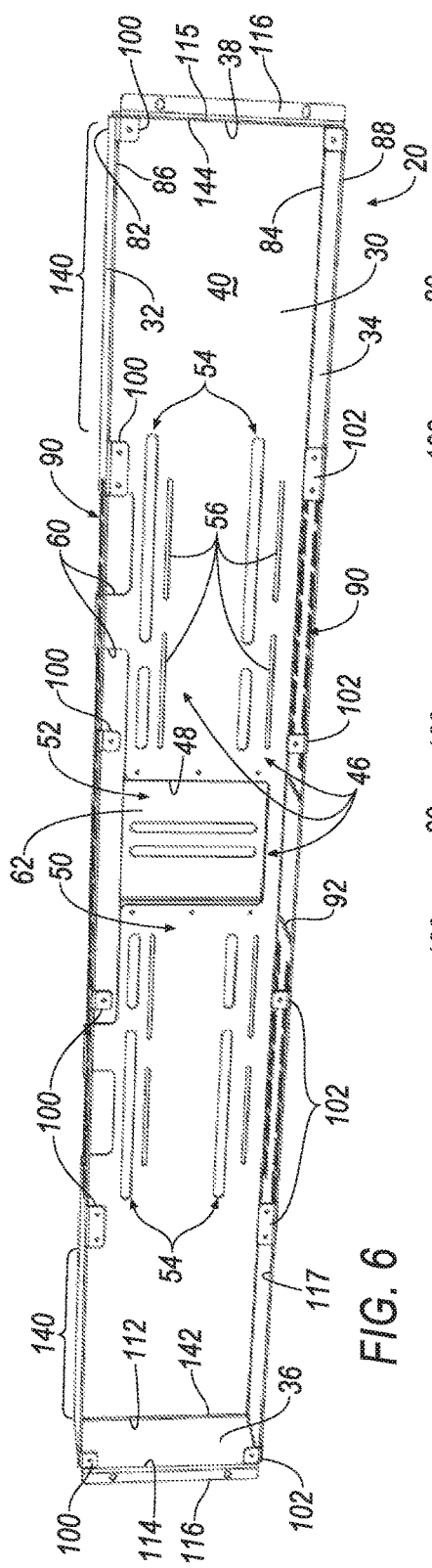
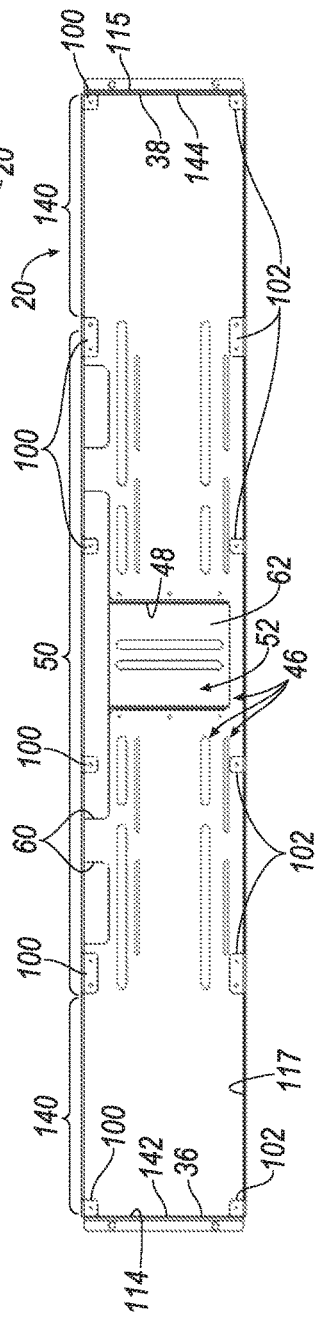
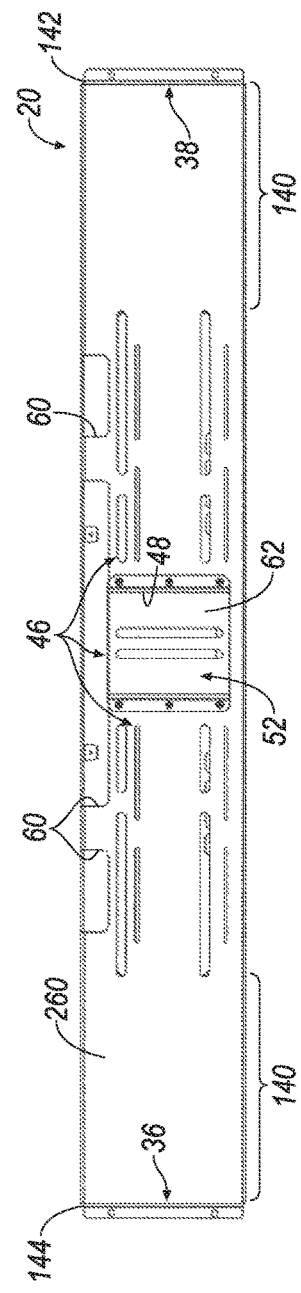
FIG. 6
FIG. 7
FIG. 8

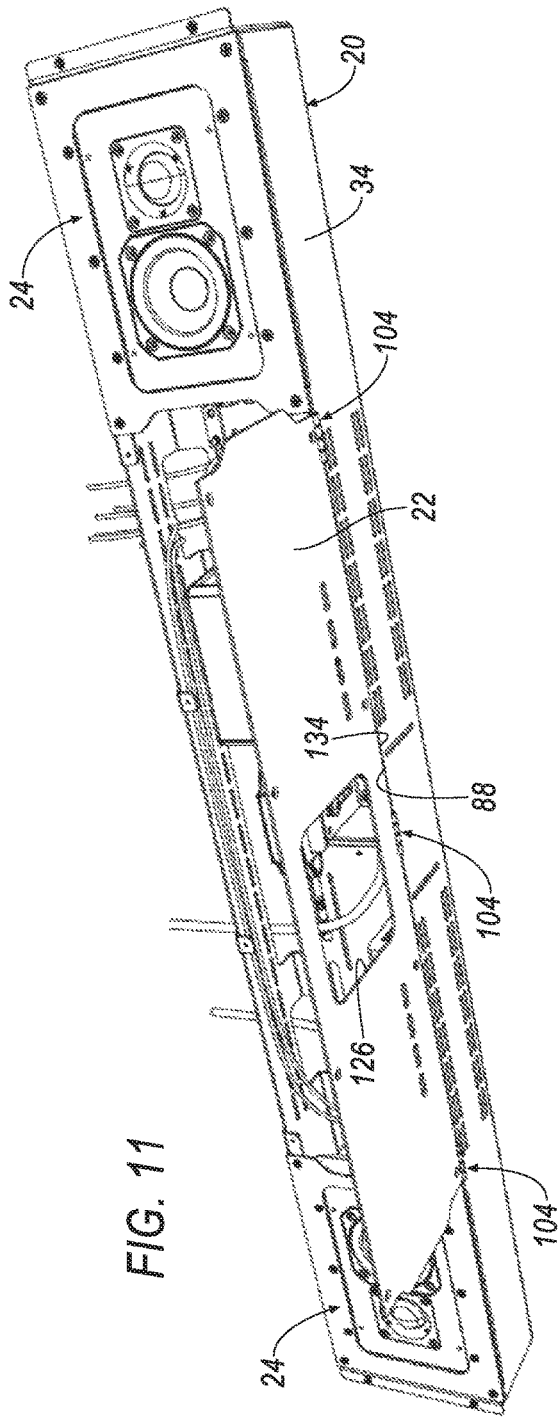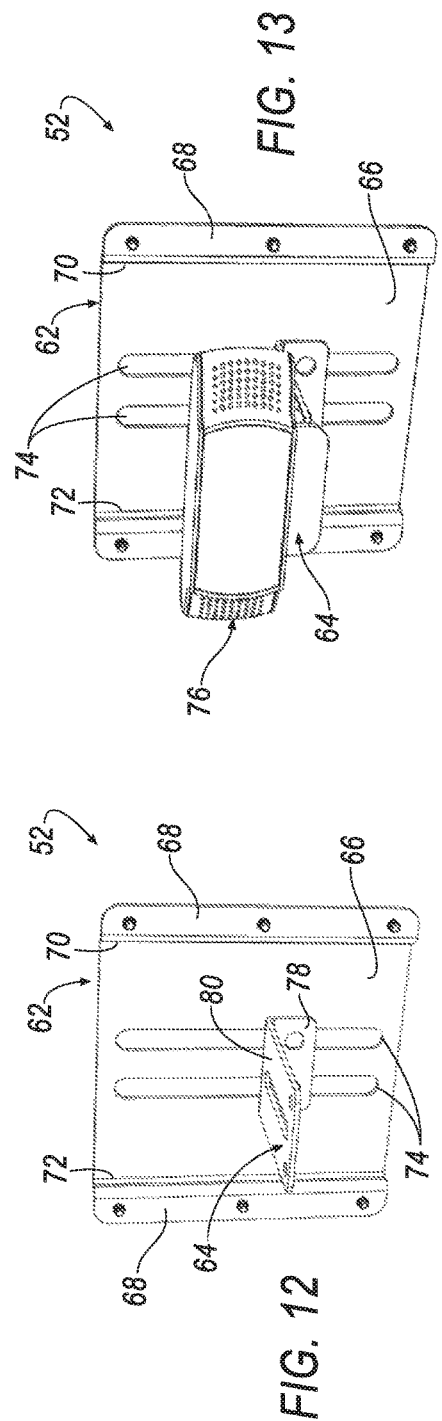

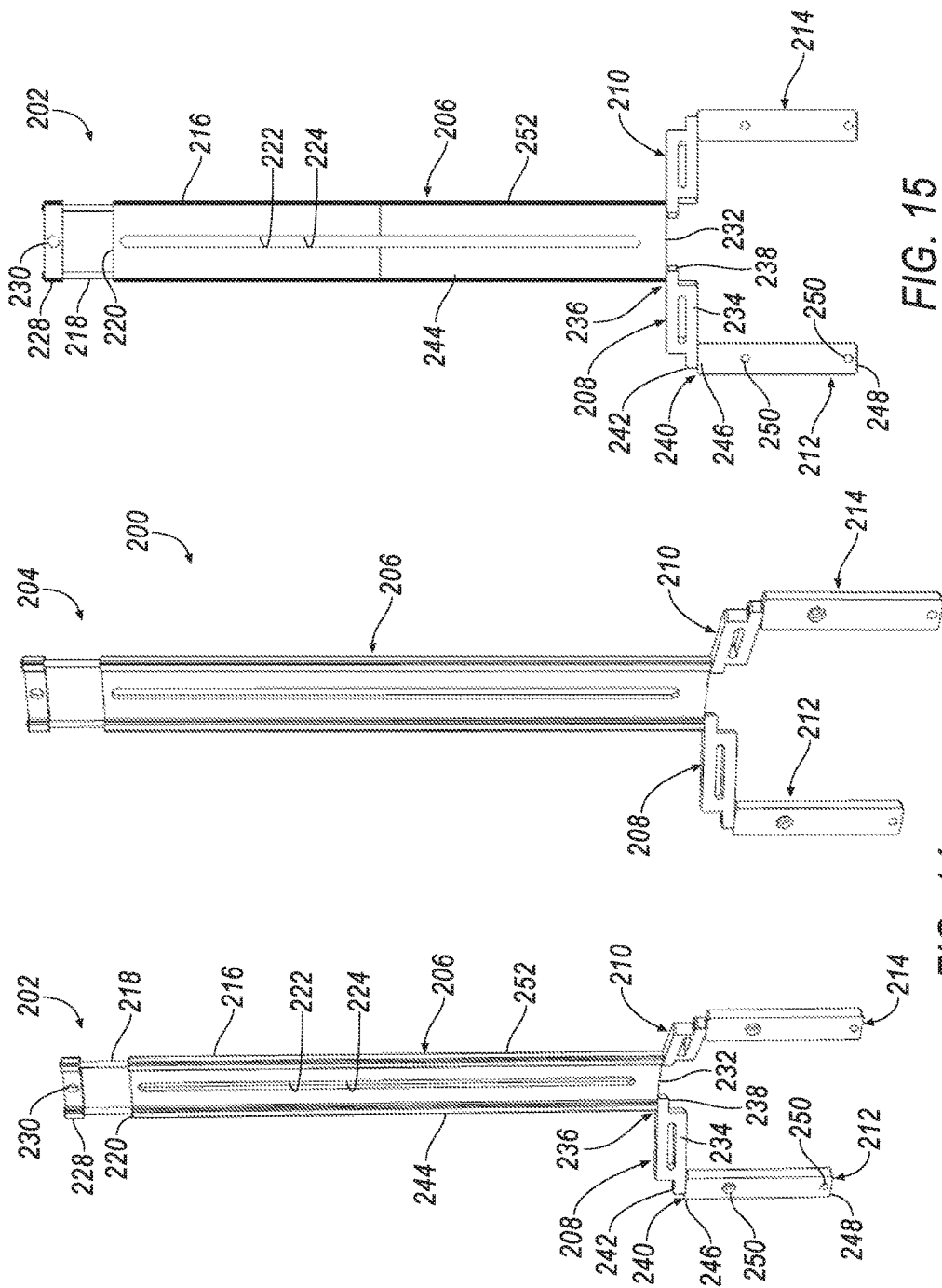

COMPONENT RACK FOR A DISPLAY

CROSS-REFERENCE TO RELATED APPLICATION(S)

This application claims the benefit of U.S. Provisional Patent Application Ser. No. 62/346,901 filed on Jun. 7, 2016.

TECHNICAL FIELD

The present disclosure relates to a component rack for a display, and more particularly, a component rack adapted to carry modular electronic devices.

BRIEF DESCRIPTION OF THE DRAWINGS

One or more embodiments of the invention will hereinafter be described in conjunction with the appended drawings, wherein like designations denote like elements, and wherein:

FIG. 1 is a perspective view of a television and a component rack that includes a grill to hide the remainder of the rack;

FIG. 2 is a front view of the component rack of FIG. 1, wherein the grill has been removed;

FIG. 3 is a top view of the component rack, wherein one of two loudspeaker assemblies is shown in an exploded view;

FIG. 4 is a side view of the component rack shown in FIG. 3;

FIG. 5 is a front perspective view of the component rack shown in FIG. 3;

FIG. 6 is a perspective view of a frame of the component rack;

FIG. 7 is a front view of the frame shown in FIG. 6;

FIG. 8 is a rear view of the frame shown in FIG. 6;

FIG. 11 is a bottom perspective view of the frame and front plate, illustrating the front plate hinged in the open position.

FIG. 12 is a perspective view of a camera mount adapted to be coupled to the frame, as shown in FIG. 10;

FIG. 13 is a perspective view of a camera carried by the camera mount of FIG. 12;

FIG. 14 is a perspective view of a component rack mount adapted to couple the component rack to the television;

FIG. 15 is a rear view of one member of the rack mount;

SUMMARY

Figure 9:
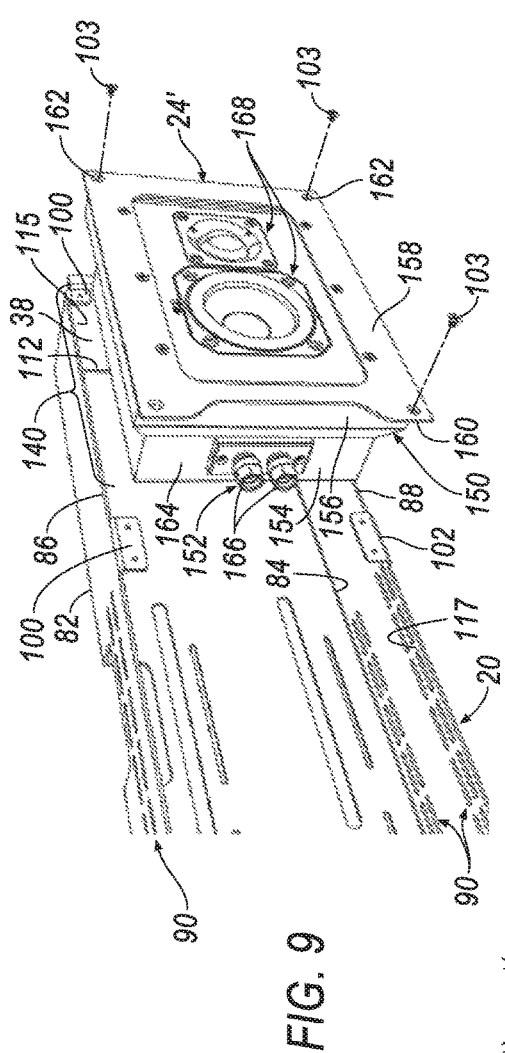
FIG. 9 is a partial perspective view of the frame shown in FIG. 6, wherein a loudspeaker assembly is shown in an exploded view.

A component rack for a display is described herein. The display may be a television, a monitor, or the like, as described below. According to one embodiment, the component rack includes: a frame that includes: a base, a first wall, and a second wall arranged to form a U-shaped cavity; a first door located at one end of the frame; a second door located at another end of the frame; and a plurality of component modules located within the cavity and adapted to be coupled to the frame, wherein the frame and an inboard side of each of the plurality of component modules define an electronics chamber region, wherein the frame is adapted to carry modular electronic devices.

According to the at least one example set forth above, the first and second doors are independently pivotable with respect to the frame, wherein the first and second doors define an axial length of the cavity.

According to the at least one example set forth above, at least two of the plurality of component modules are loudspeaker assemblies.

According to the at least one example set forth above, the at least two of the plurality of component modules are slide-ably coupled to the frame facilitating axial displacement relative thereto.

According to the at least one example set forth above, the component rack further may include a front plate coupled to the first wall, the second wall, or both.

According to the at least one example set forth above, the front plate is coupled to the second wall with a 90-degree hinging element, wherein, when the front plate is in an open position, the front plate extends radially-outwardly of the frame providing a workspace platform.

According to the at least one example set forth above, the base is adapted to be mounted to at least one of: the display via a rack mount, a surface of a building wall, or within the building wall.

According to the at least one example set forth above, the component rack further may include a front plate coupled to the first and second walls and a grill coupled to the frame, wherein the grill comprises a light-blocking mesh, wherein the mesh comprises at least one pass-through region which is more transparent than a remainder of the mesh, wherein a location of the at least one pass-through region corresponds with a location of a hole in the front plate.

According to the at least one example set forth above, the component rack further may include a rack mount that includes: a first member, and a second member, wherein each of the first and second members include: a telescopic rail; at least one leg; at least one foot coupled to the frame, wherein the rail, the at least one leg, and the at least one foot are independently pivotable with respect to another.

According to the at least one example set forth above, the foot includes an L-shaped bracket.

According to at least one other example, a component rack for a display is described that includes: a frame that includes: a base, a first wall, and a second wall arranged to form a U-shaped cavity that is open at opposite axial ends; and at least two component modules located within the cavity and adapted to be coupled to the frame, wherein the frame and a respective inboard side of each of the at least two component modules define an electronics chamber region, wherein the frame is adapted to carry modular electronic devices, wherein the at least two component modules are axially displaceable with respect to the frame.

According to the at least one example set forth above, the at least two component modules are loudspeaker assemblies.

According to the at least one example set forth above, the at least two component modules are slide-ably coupled to the base.

According to the at least one example set forth above, the component rack further includes a front plate coupled to the first wall, the second wall, or both.

According to the at least one example set forth above, the front plate is coupled to the second wall with a 90-degree hinging element, wherein, when the front plate is in an open position, the front plate extends radially-outwardly of the frame providing a workspace platform.

According to the at least one example set forth above, the base is adapted to be mounted to a wall.

According to the at least one example set forth above, the component rack further includes a front plate coupled to the first and second walls and a grill coupled to the frame, wherein the grill comprises a light-blocking mesh, wherein the mesh comprises at least one pass-through region which is more transparent than a remainder of the mesh, wherein a location of the at least one pass-through region corresponds with a location of a hole in the front plate.

According to the at least one example set forth above, the component rack further may include a rack mount that includes: a first member, and a second member, wherein each of the first and second members include: a telescopic rail; at least one leg; and at least one foot coupled to the frame, wherein the rail, the at least one leg, and the at least one foot are independently pivotable with respect to another.

According to the at least one example set forth above, the foot comprises an L-shaped bracket.

According to at least one other example, a rack mount for coupling a component rack and a display is described that includes: a first member, and a second member, wherein each of the first and second members include: a telescopic rail adapted to couple to the display; at least one leg; and at least one foot adapted to couple to the component rack, wherein the rail, the at least one leg, and the at least one foot are independently pivotable with respect to another.

DETAILED DESCRIPTION OF THE ILLUSTRATED EMBODIMENT(S)

Referring in more detail to the drawings, FIG. 1 shows an entertainment system 10 that includes a display or monitor 12 and a component rack 14 mounted below the display 12, wherein a width of the component rack 14 matches (or is equal to) a width of the display 12. In the illustrations, the display 12 is shown as a flat-screen television; however, this is not required. The component rack 14 is adapted to carry a number of modular electronic components or devices and provide an orderly and minimalistic presentation to the user. It will be appreciated, for example, that conventional home entertainment systems typically include, among other things, a television, a cable box, an audio system that may include a sound bar, a modem and wireless router, etc.—all of which may be carried by one or more furniture pieces, one or more wall mounts, or a combination thereof. These electronic modules are often accompanied by a tangled web of power cables, coaxial cable, HDMI cables, and the like. And in some instances, wiring or interconnect cables are undesirably exposed or in view because the modules or components are located remotely from the television or the like. The component rack 14 described herein is adapted to package and hide the cables and electronic modules in a minimalistic fashion and therefore focus the viewer's attention to the television 12. In at least some embodiments, such as the one shown in FIG. 1, it is desirable that the component rack 14 be hidden by a custom fit grill and be perceived as part of the television 12 itself.

FIGS. 1-13 illustrate various aspects of the component rack 14. Rack 14 includes a frame 20, a front plate 22, one or more component modules 24, and a grill 26 (the grill being shown only in FIG. 1). The frame 20 may be configured to carry the front plate 22 and component module(s) 24, as well as other modular electronic devices 28 (such as those shown in FIG. 10 and which will be described more below). For example, in one embodiment, the frame 20 includes a base 30, a first or upper wall 32, a second or lower wall 34, and third and fourth or end walls 36, 38 (see FIGS. 6-7). For example, the base 30 may be adjoined or coupled to each of the walls 32-38, and the base 30, upper wall 32, and lower wall 34 may be arranged to form a U-shaped channel or cavity 40 that extends axially between end walls 36, 38. As used herein, the terms upper, lower, top, bottom, and the like are not intended to be limiting, but are used for explanatory purposes only. For example, the orientation of the frame 20 instead may be flipped or rotated so that the upper wall 32 is below the lower wall 34, so that the base 30 is the bottom (rather than the rear or back side), and the like.

In at least one embodiment, the base 30 is a flat plate having a plurality of openings 46 therethrough (see FIGS. 6-8). According to at least one embodiment, one base plate opening 46 is a void 48 is located in an electronics chamber region 50 of the frame 20 (e.g., a region inboard of and spaced from each of the end walls 36, 38). In one exemplary embodiment, the void 48 is centered between end walls 36, 38 and adapted to receive a camera mount 52 having adjustment features, as will be explained more below. While the illustrated void 48 is rectangular, the shape and size of the void may vary.

Other openings 46 of the base 30 may include axially extending mounting slots 54—some of which may have different widths, lengths, etc. For example, in the illustrated embodiment, one or more pairs of the mounting slots 54 may be adapted to receive a mounting bracket adapted to couple the television to component rack, as will be described below. Each pair of mounting slots 54 may be spaced from and parallel to one another. In one non-limiting embodiment, the pairs of mounting slots 54 only extend within the electronics chamber region 50—e.g., thereby permitting access to the mounting slots 54 when component modules 24 are installed, as will be explained in greater detail below. In the illustrations, four pairs of mounting slots 54 are illustrated; however, this is merely an example (e.g., other quantities are possible). Further, in other embodiments, the mounting slots 54 need not be pairs.

Other openings 46 in the base 30 may include mounting holes or features 56 adapted to receive modular electronic devices 28 in the chamber region 50. In at least the illustrated embodiment, the features 56 extend axially between the end walls 36, 38 and are parallel to one another (and parallel to mounting slots 54). While not required, the mounting features 56 may be narrower than the mounting slots 54 as the mounting slots 54 are adapted to receive fasteners suitable for carrying the entire component rack 14 (plus payload), whereas the mounting features 56 are adapted to receive smaller fasteners suitable for carrying a lighter payload (e.g., the modular electronic devices 28). Non-limiting examples of the modular electronic devices 28 include a loudspeaker amplifier, a loudspeaker crossover unit, a cable box, a modem, a wired or wireless router, a gaming system, etc., as well as any corresponding electronic connections or links 58 (see FIG. 10) for coupling the devices 28 to one another or to the television 12 (e.g., these include cable harnesses, wiring, and the like). Connection openings 60 may be provided in the base 30 as well which permit cable harnesses, wiring, and the like to be routed between the chamber region 50 and the television 12, wall outlet, etc. In the illustrated example, the connection openings 60 are L-shaped—e.g., a cutout of the base 30 and the upper wall 32 (e.g., see FIGS. 3 and 7-8). The L-shaped opening(s) 60 provide component rack mounting versatility—e.g., permitting the cable harnesses, wiring, and the like 60 to be routed more through a base portion of the opening 60 or more through an upper wall portion of the opening 60, depending on the mounting arrangement of the component rack 14 with respect to the television 12.

As discussed above, the base 30 also may include the camera mount 52 (see e.g., FIGS. 6-8, 10, and 12-13). In at least one embodiment, the mount 52 may include a platform 62 and a L-bracket 64. The platform 62 may include a flat portion 66 having flanges 68 on opposite sides 70, 72. The flat portion 66 may have any suitable features for coupling the platform 62 to the bracket 64. For example, the flat portion 66 may include two parallel, elongated slots 74—which, when the mount 52 is coupled to the base 30, extend transversely with respect to the mounting slots 54 and/or mounting features 56. These vertically-oriented slots 74 may provide vertical adjustment or translation of a camera 76 carried by the L-bracket 64, as described below. In at least one embodiment, the flanges 68 have holes that correspond to holes in the base 30 for coupling the mount 52 thereto. Further, the flanges 68 may be laterally offset with respect to the flat portion 66—e.g., so that the flat portion 66 may be located outside or outboard of the chamber region 50 (as shown in the top view of FIG. 3). In at least one implementation, the outboard flat portion 66 may accommodate cameras 76 of different sizes (e.g., having different depths); e.g., to ensure that the camera 76 is adequately spaced from the front plate 22, does not interfere with the front plate 22 (e.g., in a closed position), or does not extend frontwardly therebeyond. A vertical portion 78 of the L-bracket 64 may have holes that correspond to the elongated slots 74 for fastening the bracket 64 to the platform 62, and a horizontal portion 80 of the L-bracket 64 may have holes for coupling the camera 76 thereto with fastener(s) (e.g., a camera such as a webcam or the like). For example, the horizontal portion 80 may include a slot and a pair of holes as shown in FIG. 12 enabling the camera 76 to be positioned forwardly or backwardly (e.g., with respect to the base 30).

Of course, the illustrated camera mount 52 is merely an example—other bracket shapes, other bracket features, and the like may be used instead. In addition, embodiments exist wherein camera mount 52 is integral to the base 30 (i.e., is not decouplable or detachable). In other embodiments, mount 52 is not used (and/or alternative mount is used instead)—e.g., to accommodate cameras having deeper depths than the illustrated camera—e.g., to fit appropriately within the chamber region 50 (e.g., to utilize the camera's desired field of view, make use of panning/tilting features of the camera, etc.).

The upper and lower walls 32, 34 of the frame 20 each may be flat plates extending from the base 30 (see FIGS. 6, 9-11). Each plate may extend from a proximal or rear edge 82, 84 (coupled to the base) to a distal or front edge 86, 88—thereby defining the depth of the cavity 40. The upper wall 32, the lower wall 34, or both may have a plurality of ventilation or cooling holes 90 and or additional mounting features 92 (e.g., in the form of holes, elongated slots, etc.). In at least one embodiment, each of the respective front edges 86, 88 of the upper and lower walls 32, 34 may have one or more coupling features 100, 102 adapted to receive and fasten the front plate 22 and component modules 24. For example, in the illustrations, the coupling features 100 are flanges; however, this is merely an example. Flanges 100 are shown extending from the upper wall 32 toward the lower wall 34, and corresponding flanges 102 are shown extending from the lower wall 34 toward the upper wall 32. The quantity of twelve flanges 100, 102 is merely an example of course; other quantities are also possible. Further, each flange 100, 102 may have a hole for receiving a fastener (e.g., see FIGS. 2 and 5 showing fasteners 103).

According to one embodiment, the lower wall 34 is coupled to the front plate 22 using one or more hinging elements 104—e.g., located proximate to the front edge 88 (FIG. 11). The hinging element 104 may be configured for any suitable range of rotation about its pivotal axis; however, in at least one embodiment, the hinging element(s) opens approximately 90 degrees (e.g., having a rotational stop inhibiting rotation beyond 90 degrees). In one implementation, hinging element(s) 104 on the lower wall 34 are used instead of at least some of the coupling feature(s) 102; this of course is merely one example. It should be appreciated that other fastening devices could be used instead of a hinge as well; e.g., any suitable fastener, clip, clasp, etc. Alternatively, hinging element(s) could be coupled to the upper wall 32 instead of the lower wall 34.

End walls 36, 38 may be at least similar or identical to one another; therefore, only one will be described. End wall 36 (FIG. 6) may be a flat plate coupled to the respective axial ends of base 30, upper wall 32, and lower wall 34 to form a rectangular volume (or any other suitable volume). Like the upper and lower walls 32, 34, a proximal or rear edge 112 of end wall 38 (coupled to base 30) may extend to a distal or front edge 115 (or 114 on end wall 36)—and, in one implementation, the depth of upper, lower, and end walls 32-38 may be identical. In at least one embodiment, a lip 116 adapted to couple the grill 26 to the frame 20 may extend axially outwardly of the front edge 115—e.g., away from the cavity 40. The lip 116 may have holes or any other suitable mounting features which may be used further to secure the grill 26 to the frame 20.

As described above, in at least one embodiment, the cavity 40 defined by the base 30 and upper, lower, and end walls 32-38 may be a rectangular volume (and an opening 117 to the cavity being defined by the edges 86, 88, 114, 115 of walls 32-38). Further, the length of the frame 20 may be pre-configured to match standard television widths. For example, a 48-inch diagonal television typically has a width of 44 inches, a 55-inch diagonal television typically has a width of 48 inches, and a 65-inch diagonal television typically has a width of 58 inches. Thus, frames 20 may be pre-configured to have lengths of 44 inches, 48 inches, and 58 inches. These lengths are merely examples of course; other lengths may be used as well. When the length of the frame matches the length of the television, the component rack 14 is more readily and desirably perceived as part of the television 12 itself.

In at least some implementations, the frame 20 may be comprised of a single metal plate or blank that is cut and bent or otherwise fabricated to form the base 30 and walls 32-38 (e.g., so-called heavy-bending using specially-adapted fabrication machines). Non-limiting suitable materials include steel, aluminum, and plastic. In some implementations, the metal plate is coated with paint, powder coating, anodization, plastic colored-dye, etc., just to name a few non-limiting examples. Coating are applied typically after the plates are formed and heavy-bending has occurred. Of course, all of these materials are merely exemplary; e.g., the frame 20 also could be comprised of other materials such as wood, plastic, etc.

Figure 10:
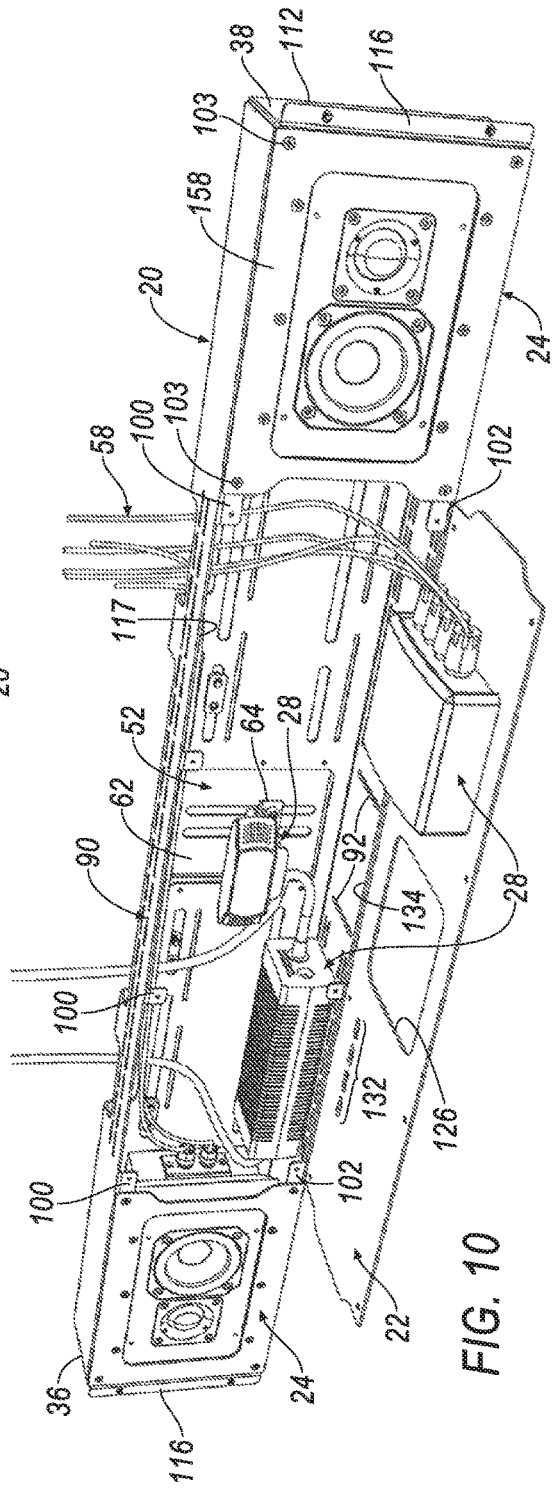
FIG. 10 is a perspective view of the component rack, the rack including the frame, two loudspeaker assemblies carried by the frame, a front plate in an open position, and various modular electronic devices.
Figures 16, 17, 18:
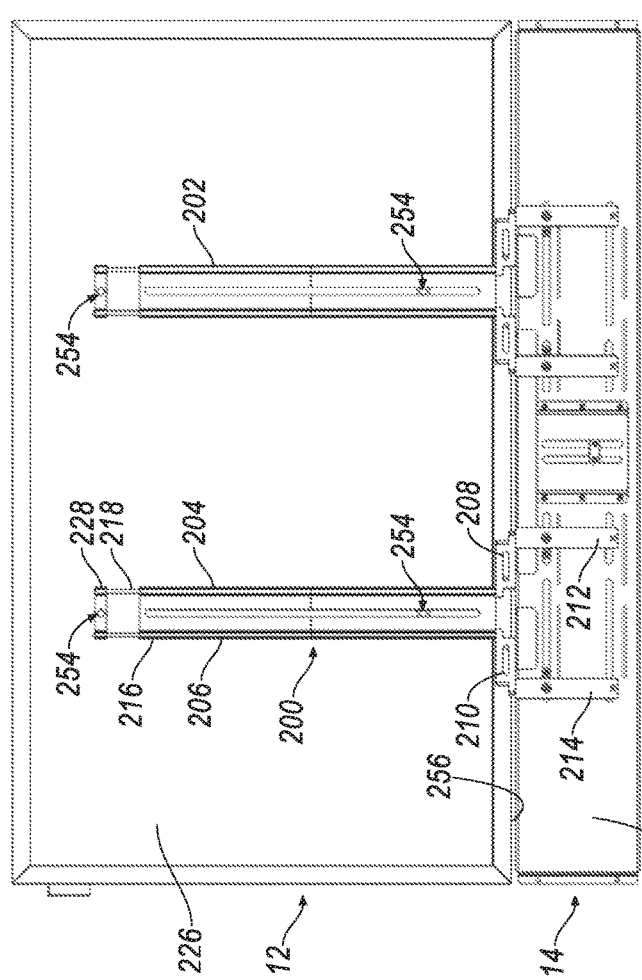
FIG. 16 is a rear view of the television and component rack shown in FIG. 1 illustrating the rack mount coupling the television and component rack together.
FIG. 17 is a side view of the television and component rack shown in FIG. 16.
FIG. 18 is a top view of the television and component rack shown in FIG. 16.
Figure 19:
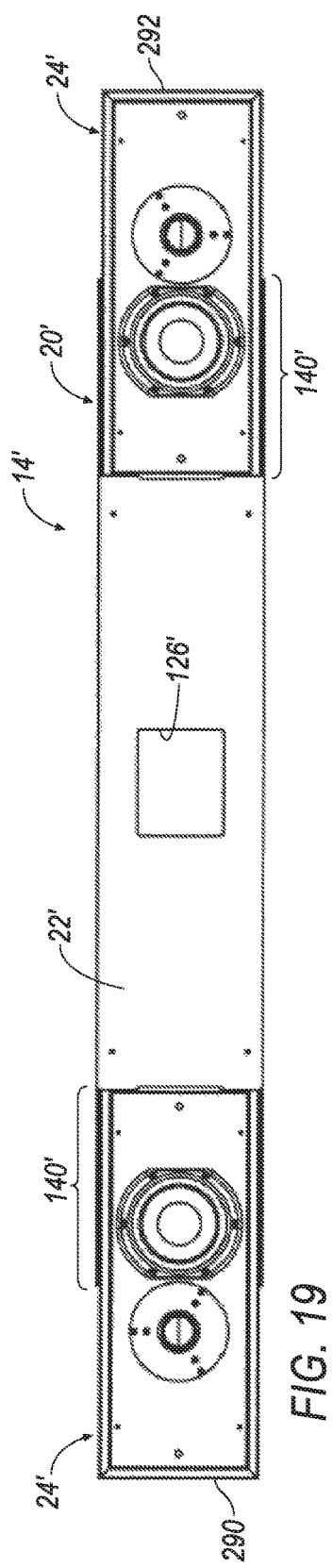
FIG. 19 is a front view of a second embodiment of the component rack having axially extending loudspeaker assemblies.
Figure 20:
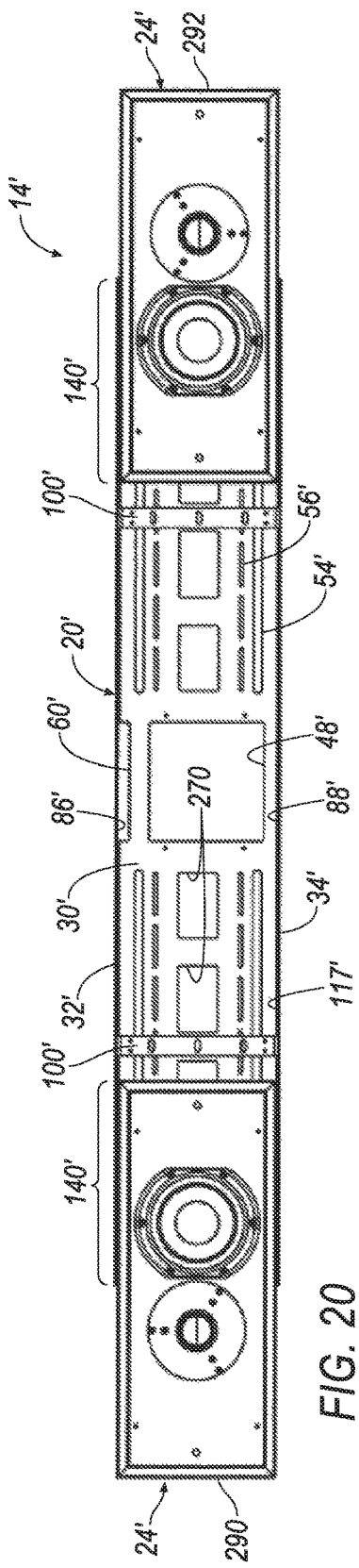
FIG. 20 is a front view of the embodiment shown in FIG. 19 having a front plate removed.
Figure 21:
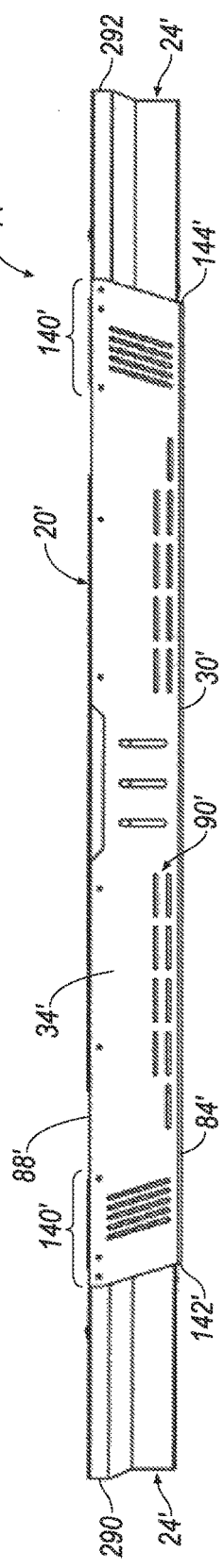
FIG. 21 is a bottom view of the embodiment shown in FIG. 19.

The front plate, security cover, or fascia plate 22, which couples to the frame 20, may be a flat plate that is generally rectangular and has ears 118 extending axially from each end 120, 122 (see FIGS. 2, 5, 10). In general, the front plate 22 may enclose or limit access to the modular devices 28 within the chamber region 50 (e.g., child-proof or the like). The front plate also has a number of openings 124. In at least one embodiment, front plate 22 has an aperture 126 that corresponds with the camera mount 52 (and/or void 48) of base 30. Thus, for example, in at least one implementation, aperture 126 is centrally located between end walls 36, 38 and/or centrally located between ends 120, 122 of front plate 22, as is the camera mount 52. In this manner, the aperture 126 can be adapted to provide a viewing window for the camera 76. The aperture 126 may be any suitable shape; e.g., in one implementation, the aperture 126 is rectangularly-shaped and sized to permit a camera having a 4:3 or 16:9 aspect ratio to utilize its full field of view when the camera is located within the chamber region 50; e.g., so that the camera may capture images of objects in front of the component rack 14, so that the television 12 and camera 76 can be used together as a video conferencing system.

Other openings 124 of front plate 22 include a number of mounting holes or features 128 about a periphery 130 of front plate—e.g., which correspond to the holes in the coupling features 100, 102 (which extend from upper and lower walls 32, 34) and receive fasteners 103. In addition, other openings 124 may include remote control signal-receiving holes 132 (e.g., so-called infrared repeater openings or the like). These holes 132 are illustrated as axially extending slots; however, any other suitable shape and size may be used instead. FIGS. 2 and 5 illustrate four elongated and linearly-arranged holes 132 on each side of aperture 126; however, this is merely exemplary and other quantities and arrangements are also possible. Further, while not shown in the illustrations, other mounting holes, slots, features, etc. may be located on front plate 22—e.g., for coupling other modular electronic devices 28 within the chamber region 50 (e.g., such as the cable box shown in FIG. 10).

According to one embodiment, a lower edge 134 of front plate 22 is configured to receive the one or more hinging elements 104. As described above, in one embodiment the front plate 22 and lower wall 34 are coupled together using 90-degree hinge(s). In at least one embodiment, in an open position, the front plate 22 extends radially outwardly of the lower wall 34—e.g., so that the lower wall 34 and front plate 22 are generally parallel (or even within the same horizontal plane). In this manner, the front plate 22 can serve as a workman's platform for tools, etc. during service or installation of the modular electronic devices carried within the chamber region 50.

Component modules 24 also may be coupled to the frame 20—e.g., on either side of the front plate 22 (see FIGS. 3-5, 9-10). In at least one embodiment, two component modules 24 are carried within distal regions 140 of the frame cavity 40—e.g., axially outboard of the chamber region 50. As used herein, the distal region(s) 140 of the cavity 40 comprise a volume defined by a region between the chamber region 50 and a distal or axial end 142 (or 144) of the base 30. And in the presently described embodiment, the distal ends 142, 144 of the base 30 coincide with the end walls 36, 38; however, as will be described more below, this is not required. In the illustrations, component module 24 is coupled to flanges 100, 102 using any suitable fasteners 103 (FIG. 9). Of course, this is merely an example and other embodiments are possible. In general, each component module 24 may be identical; therefore, only one will be described.

As best shown in FIGS. 4 and 9, component module 24 may include a body or cabinet 150 having an electrical interface 152. The body 150 may be any suitable shape; however, in the illustrations, the body 150 includes a rectangular rear portion 154 extending to a wider front portion 156. The rear and front portions 154, 156 may be sized to fit within the distal region 140 of the cavity 40. A circumferential bracket 158 may be coupled to the front portion 156 of the body 150. The bracket 158 may include a lip 160 having coupling features 162 which correspond to the coupling features 100, 102 on the frame 20; and the lip 160 may extend radially outwardly to overlay the distal edges 86, 88, 114 of the walls 32, 34, 38. Thus, it will be appreciated that the component module 24 may be inserted into and/or removed from the component rack 14 from the front of the rack. The bracket 158 may be integral to the body 150 or may be a separate part which may be attached to the front portion 156 of the body 150 (e.g., via fasteners).

The electrical interface 152 may be positioned on an inboard side 164 of the body 150 thereby being accessible via the chamber region 50. The illustrated electrical interface 152 in FIG. 9 includes two electrical connections 166; however, this is merely exemplary (e.g., any suitable number of plugs, jacks, etc. may be used).

In at least one preferred implementation, the component module 24 is a loudspeaker assembly. As used herein, a loudspeaker assembly 24 includes the cabinet 150 and at least one driver 168. Drivers 168 may include any suitable loudspeaker (e.g., a tweeter loudspeaker, a mid-range loudspeaker, a woofer, a sub-woofer, etc.) and may include various components known in the art, including a pole, a magnet, a basket, a voice coil, a cone, etc. Loudspeaker assemblies 24 can include other components as well (e.g., such as a passive crossover unit, etc.). The illustrated loudspeaker assembly 24 includes two drivers 168—e.g., and thus the interface 152 includes two electrical connections 166 (e.g., one for each driver 168).

In some loudspeaker assembly implementations, each loudspeaker assembly 24 includes four drivers 168—a first driver set (e.g., a woofer and a tweeter) in one sub-compartment of the cabinet 150 and a second driver set (e.g., a woofer and a tweeter) in another sub-compartment of the cabinet 150. The sub-compartments may be partitioned using an inner wall or the like—thereby acoustically isolating the first driver set from the second driver set. According to one embodiment, two such loudspeaker assemblies 24 may be wired in a three-channel arrangement or configuration. For example, a first driver set of the first loudspeaker may be coupled to a first channel, a first driver set of the second loudspeaker may be coupled to a second channel, and the second driver sets of each of the first and second loudspeakers may be share or split a third or center channel. Such three-channel arrangements may be suitable for producing or contributing to surround-sound or the like.

It should be appreciated that non-loudspeaker embodiments of component module 24 are also possible. For example, the components modules could include other electronics, decorative elements, or combination of both.

With the modular electronic devices 28 installed within the chamber region 50, the front plate 22 coupled to the frame 20, and the loudspeaker assemblies 24 coupled within the distal regions 140 of the frame 20, the grill 26 may be installed. The grill may include a frame 170 and a mesh 172 (FIG. 1). The frame 170 may define the shape and size of the grill 26 and may be adapted to carry the mesh 172. Frame 170 also may include coupling features 174 adapted to secure the grill 26 to the axially extending lips 116 (hidden in FIG. 1). FIG. 1 illustrates a rectangular frame 170; however, this is merely an example. The mesh 172 may be fabric, plastic, metal, or any other suitable material. In at least one embodiment, the mesh 172 shrouds the remainder of the component rack 14 therebeneath but is configured to permit sound from loudspeaker assemblies 24 to permeate therethrough. Thus, FIG. 1 illustrates that the mesh 172 may hide loudspeaker assemblies 24, the frame 20, the front plate 22, and all or most modular electronic devices 28 installed within the chamber region 50. Thus, the grill 26 desirably facilitates the perception that the component rack 14 is part of the television 12 itself. According to one embodiment, the camera 76 is not hidden by the mesh 172, while other electronics devices 28 are. For example, camera 76 may be exposed to the user via an aperture 176 within the mesh 172 that correspondingly aligns with the aperture 126 of the front plate 22—e.g., thereby enabling video conferencing and other suitable camera-based applications.

Modular electronic devices 28 carried within the chamber region 50 of the component rack 14 include any suitable power management devices, communication electronics, or the like for use with the television 12. Non-limiting examples of modular electronic devices 28 include loudspeaker amplifiers, loudspeaker passive or active crossover units, splitters, converters, repeaters (e.g., infrared repeaters), switches, baluns, thermal management devices, sensors, source devices such as personal mini-computers, digital video camera(s) (e.g., including but not limited webcams), cable modem routers, digital cable boxes, digital video recorders, gaming devices or system consoles, etc. These and other devices may be carried within the chamber region 50 of the frame 20 by fastening or otherwise coupling the electronic devices 28 to the base 30, the lower wall 32, the upper wall 34, the front plate 22, or any combination thereof. As discussed briefly above, the camera 76 may be coupled to the camera mount 52—e.g., in one embodiment, to the L-bracket 64 of the mount 52—e.g., being positioned with respect to the apertures 126, 176 so that the camera 76 has a suitable field of view frontwardly outwardly of the component rack 14. Further, the assembled component rack 14 has power management and wire management features. For example, within chamber region 50, cable ties or fasteners may be used to organize and fasten cable harnesses, wiring, and the like (e.g., including but not limited to Ethernet cables, TOSLINK cables, etc.) to the component rack 14 in order to facilitate easier service and/or replacement of the modular electronic devices 28 and/or cable harnesses/wiring itself.

The component rack 14 is configured to be mounted to infrastructure such as a building wall or the like (not shown)—e.g., above or below the television 12. Or the component rack 14 may be mounted above or below the television 12 using a component rack mount (discussed below). In general, installation of the component rack 14 may include first installing the frame 20 without the loudspeaker assemblies 24, the modular electronic devices 28, the front plate 22, grill 26, etc. Thus, the design of the component rack 14 enables the electronic devices 28, loudspeaker assemblies 24, and other various components or parts to be serviced, replaced, upgraded, etc. at a later time without de-installation or removal of the frame 20 (e.g., from the television 14 or building wall). Conventional systems can require de-installation of the entire assembly, becoming time-intensive and even destructive to the existing building wall or other aspects of the infrastructure; furthermore, conventional systems can be designed to promote disposal and replacement of the system in its entirety. Thus, based on the discussion above, it will be appreciated that the present rack 14 constitutes an improvement over conventional systems.

According to one embodiment, the frame 20 is installed on a wall or other infrastructure (e.g., an interior or exterior building wall or the like). For example, the base 30 of the frame 20 may be positioned adjacent to the infrastructure, fasteners are located within the mounting slots 54, and then the fasteners are used to secure the frame 20 to the infrastructure. Once installed, the loudspeaker assemblies 24 may be installed by coupling the respective circumferential brackets 158 to the coupling features 100, 102 of the frame 20. Electronic devices 28 may be coupled to the mounting features 56, 92 on the base, the lower wall 32, the front plate 22, or any combination thereof using fasteners, clips, ties, etc. Similarly, the camera 76 may be coupled to the base 30 using the mount 52. All suitable cable harnesses, wiring, and the like may be installed. Thereafter, the front plate 22 and grill 26 may be coupled to the frame 20 to complete the installation.

In other embodiments, the frame 20 may be coupled to the television 12 using a component rack mount 200 (FIGS. 14-18)—e.g., rather than coupling the frame 20 to infrastructure. Other aspects of the installation may be the same as described above and will not be repeated here. Regardless of whether the rack 14 is carried by a building wall or the television 12, all components and cables therein may be proximate to the television 12 and desirably hidden from view by the front plate 22 and the grill 26—rather than having components conventionally scattered around the television and cables running through building walls, around furniture, etc.

The rack mount 200 may include two identical members 202, 204 for coupling to the television 12 to the rack 14; only one will be described below. Member 202 includes a telescopic rail 206 for coupling to the television 12, two rotatable legs 208, 210 which are coupled to the rail 206, and two rotatable feet 212, 214 which are coupled to the legs 208, 210 and which are adapted to be coupled to the frame 20 of the component rack 14. The rail 206 may include a sleeve 216 and a shank or bar 218 axially and telescopically extendable from a distal end 220 of the sleeve. The sleeve 216 and shank 218 each may have an axially extending slot 222, 224, which slots are aligned with one another so that a first fastener (not shown) may be located through the aligned slots 222, 224 and thereby be coupled to a threaded hole on a rear face 226 of the television 12. A protruding end 228 of the shank may include a through-hole 230 adapted to receive a second fastener (not shown) which can be coupled to another threaded hole on the rear face 226 of the television 12.

First and second legs 208, 210 may be coupled to an opposite and proximate end 232 of the rail 206 and may extend radially outwardly therefrom (e.g., in generally opposite directions). Each leg 208, 210 may be identical; therefore, only one will be described herein. The first leg 208 may include a body 234, a first joint 236 at one end 238, and a second joint 240 at an opposite end 242. The first joint 236 may be coupled to a lateral side 244 of the sleeve 216 so that the leg 208 may pivot at the first joint 236 relative to the sleeve 216—e.g., the leg 208 may be coupled via a pin or shaft (not shown). The second joint 240 may be coupled to an upper end 246 of the first foot 212 so that the first foot 212 may pivot at the second joint 240 relative to the leg 208—e.g., similarly, the first foot 212 may be coupled to the leg 208 via a pin or shaft (not shown). The first foot 212 may extend axially from the upper end 246 of the foot 212 to a lower end 248 thereof; e.g., and generally may be parallel to the rail 206. First foot 212 may have a pair of through-holes 250 spaced from one another between the upper and lower ends 246, 248. In at least one implementation, the spacing of the through-holes 250 corresponds to the spacing of the mounting slots 54 in the base 30—e.g., so that the foot 212 may be coupled thereto using a pair of fasteners. As shown in FIGS. 14-15, the second leg 210 (and second foot 214) may be identical to the first leg 208 and first foot 212, except that the second leg 210 is coupled to an opposite, lateral side 252 of the sleeve 216; therefore, the second leg 210 and foot 214 will not be described herein.

In the rack mount installation, the rack mount 200 directly may couple the frame 20 of the component rack 14 to the television 12. It will be appreciated that the rack mount 200 described above is configured to couple to televisions 12 of different sizes, as well as component racks 14 (e.g. such as the one described above) of different sizes. Many conventional flat screen televisions have four rectangularly-arranged, threaded mounting holes 254 on the rear face 226 thereof. The rail shanks 218 may be telescopically extended from the sleeves 216 so that the through-holes 230 of the protruding ends 228 align with the upper television mounting holes and so that the legs 208, 210 and feet 212, 214 of each member 202, 204 are proximate a bottom edge 256 of the television 12. The rails 206 may be secured to the television 12 using the first and second fasteners through the holes 232 and slots 222, 224, respectively.

The legs 208, 210 and feet 212, 214 of both members 202, 204 may be pivoted so that the feet 212, 214 of each member are flush to a rear or reverse side 260 of the frame base 30 and so that the pair of through-holes 250 in the feet 212, 214 align with the mounting slots 54 in the base 30. The feet 212, 214 then may be secured to the frame 20 using the pair of fasteners. The length of the telescopic rails 206 may be adjusted (e.g., shorter or longer) so that the frame 20 is adjacent or nearly adjacent to the bottom edge 256 of the television 12 and then the second fasteners may be fully tightened or re-tightened. In this manner, the cable harnesses, wiring, and the like, which typically hang below the television 12, may be hidden from view of the user—e.g., even if the television 12 is suspended from the ceiling or cantilevered from a building wall. Further, if the television 12 can be pivoted on a television mount (not shown), the cable harnesses, wiring, and the like are hidden—e.g., because the rack 14 pivots with the television 12.

It will be appreciated that the feet 212, 214 may be located in different locations along the mounting slots 54 of the base 30 (e.g., depending on the width of the television 12 and depending on how much the legs 208, 210 are pivoted with respect to the rails 206 and how much the feet 212, 214 are pivoted with respect to the legs 208, 210). Further, it will be appreciated that when the feet 212, 214 are located relatively closer to one another, the frame 20 may be positioned or translated forward with respect to the television 12, and when the feet 212, 214 are located relatively farther apart from one another, the frame 20 may be positioned or translated rearward with respect to the television 12. This flexibility enables the grill 26 of the component rack 14 to be flush with a front face 262 of the television 12—e.g., further promoting the image that the component rack 14 and television 12 are a single unit (e.g., see FIG. 17).

As discussed briefly above, component rack 14 may be mounted above the television 12 as well using rack mount 200. For example, in another embodiment, each member 202, 204 shown in FIGS. 14-18 may be rotated 180 degrees so that the legs 208, 210 and feet 212, 214 extend above the television 12 (e.g., the first fasteners coupling the rails 206 via the slots 222, 224 and the second fasteners coupling the through-holes 230 at the protruding ends 228). Other aspects of the installation may be similar.

FIGS. 19-23 illustrate another embodiment of a component rack 14' having a different frame 20'. In this embodiment, like numerals designate like or similar features or functions. Frame 20' includes base 30', upper wall 32', and lower wall 34'; however, it has no end walls 36, 38, thereby permitting component modules 24' (e.g., the loudspeaker assemblies) to extend axially outwardly from the frame 20', as will be described more below.

More particularly, frame 20' includes coupling features or struts 100' that provide structural support and that extend from a distal edge 86' of upper wall 32' to a distal edge 88' of the lower wall 34'. These struts 100' may be located along any suitable axial position (e.g., relative to edges 86' 88'). Two are shown; however, this is merely exemplary. Each strut 100' may have holes for coupling the front plate 22' to the frame 20'.

Figure 23:
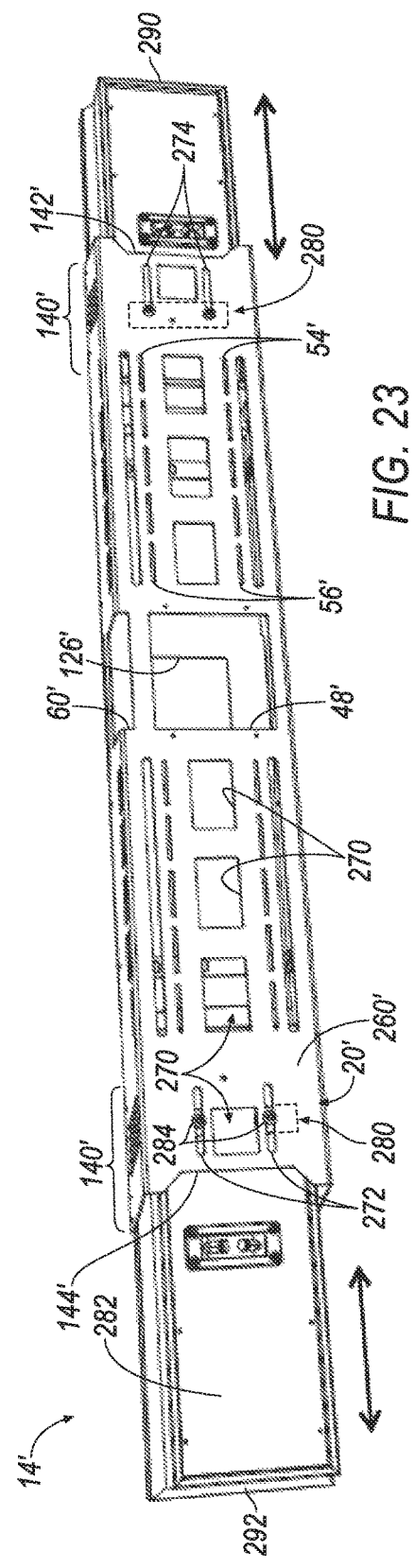
FIG. 23 is a rear perspective view of the component rack shown in FIG. 22.

As best shown in FIG. 23, a rear face 260' of the base 30' has a similar void 48', mounting slots 54', mounting features 56', connection opening(s) 60', etc. It also may include other a plurality of wider connection openings 270 that may be used to route cable harnesses, wiring, and the like, to provide cooling and ventilation to electronics therewithin, and/or to couple various modular electronic devices 28 to the television 12 or to one another. Near each of the distal or axial ends 142', 144' of the base 30', the base 30' may have component module adjustment features 272, 274. The adjustment features 272, 274 may be identical; therefore, only adjustment features 272 will be described. In at least one embodiment, the adjustment features 272 are a pair of axially extending slots that are spaced from one another. The slots 272 are inboard of the distal end 144' and extend towards the void 48' (e.g., in the distal region 140'). One of the openings 270 may be positioned between each of the pair of slots 272 (e.g., providing access to an electrical interface 152' on the loudspeaker assembly 24'. Other aspects of the frame 20' and front plate 22' may be generally similar to the features described above.

The loudspeaker assemblies 24' generally may be similar to those described above. However, in at least one embodiment, the cabinet 150' may have a coupling or corresponding adjustment feature 280 on a rear face 282 of the assembly 24'. In one implementation, the adjustment feature 280 includes a pair of threaded holes spaced from one another. The spacing of these holes 280 may correspond to the spacing of slots 272, 274 in the base 30'. Thus, limited by the length of the slots 272, 274, each loudspeaker assembly 24' may be extended or displaced axially with respect to the frame 20' (and then fastened in place using any suitable fasteners 284 which protrude through the slots 272, 274 and into the threaded holes 280). Thus, the component rack 14' may be configured to match the width of televisions having standard and non-standard widths.

Figure 22:
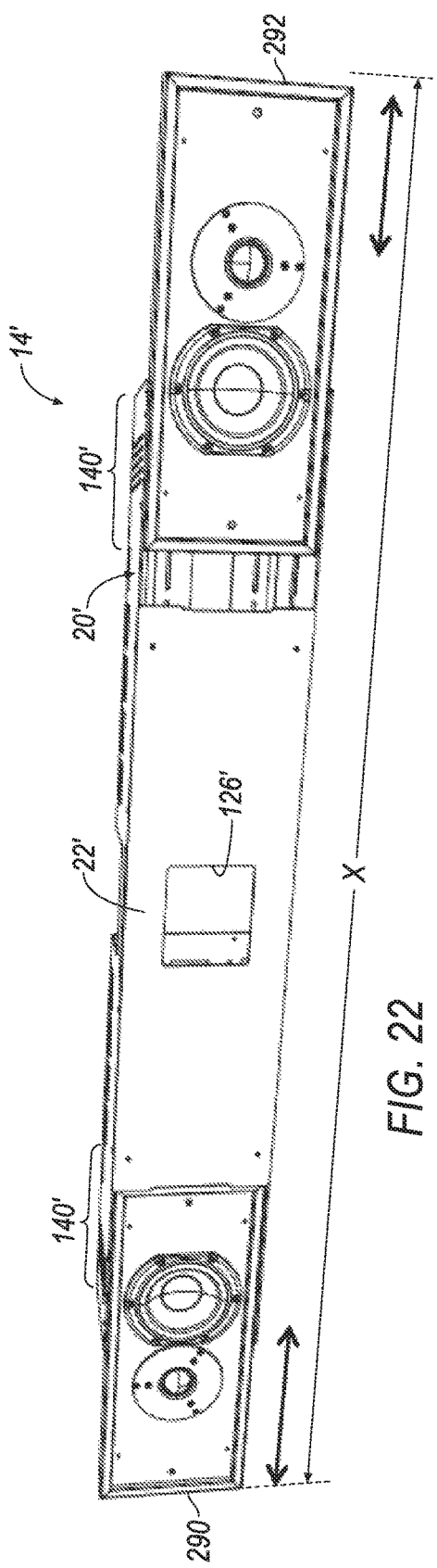
FIG. 22 is a front perspective view of the embodiment shown in FIG. 19, wherein one of the loudspeaker assemblies is extended axially outwardly.

It will be appreciated that in component rack 14' embodiment, the volume of the distal regions 140' may be increased or decreased based on the relative axial position of the loudspeaker assembly 24'. FIGS. 22-23 illustrate two loudspeaker assemblies 24' in different axial positions.

The electrical interface 152' of the loudspeaker assembly 24' may be located on the rear face 282 as well; however, this is not required. In addition, the circumferential bracket 158 may not be used (e.g., since, in at least one embodiment, the loudspeaker assembly 24' may be coupled only to the base 30'—e.g., not to the coupling features 100, 102 of the previous embodiment). The loudspeaker assemblies 24' may have any suitable features adapted to couple to the grill (not shown)—which may be made-to-order or customized—e.g., depending on the final axial length x of the component rack 14' (e.g., measured from respective axial ends 290, 292 of the speakers). Of course, in some embodiments, the grill could be axially-adjustable in length as well.

Figure 24:
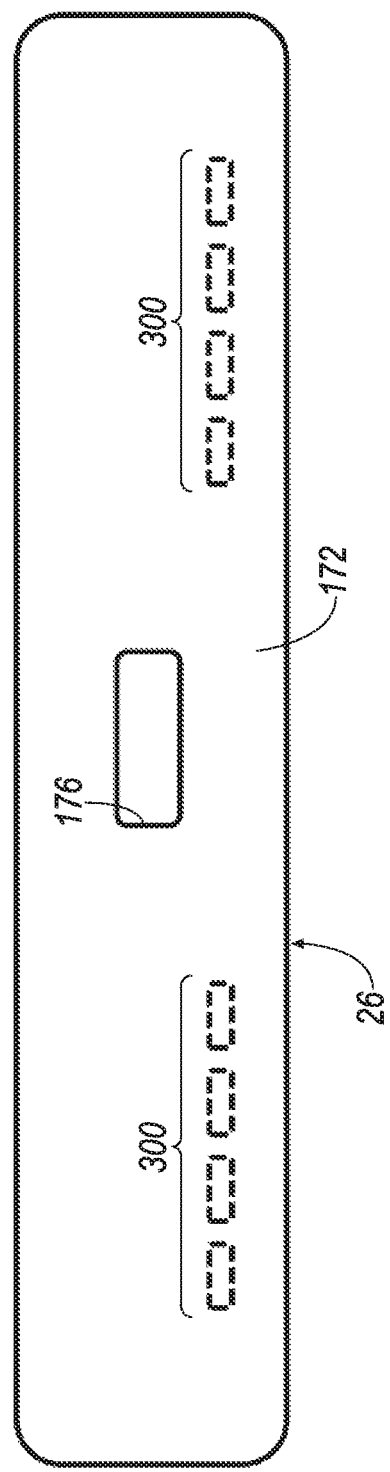
FIG. 24 illustrates another embodiment of the grill shown in FIG. 1.
Figure 25:
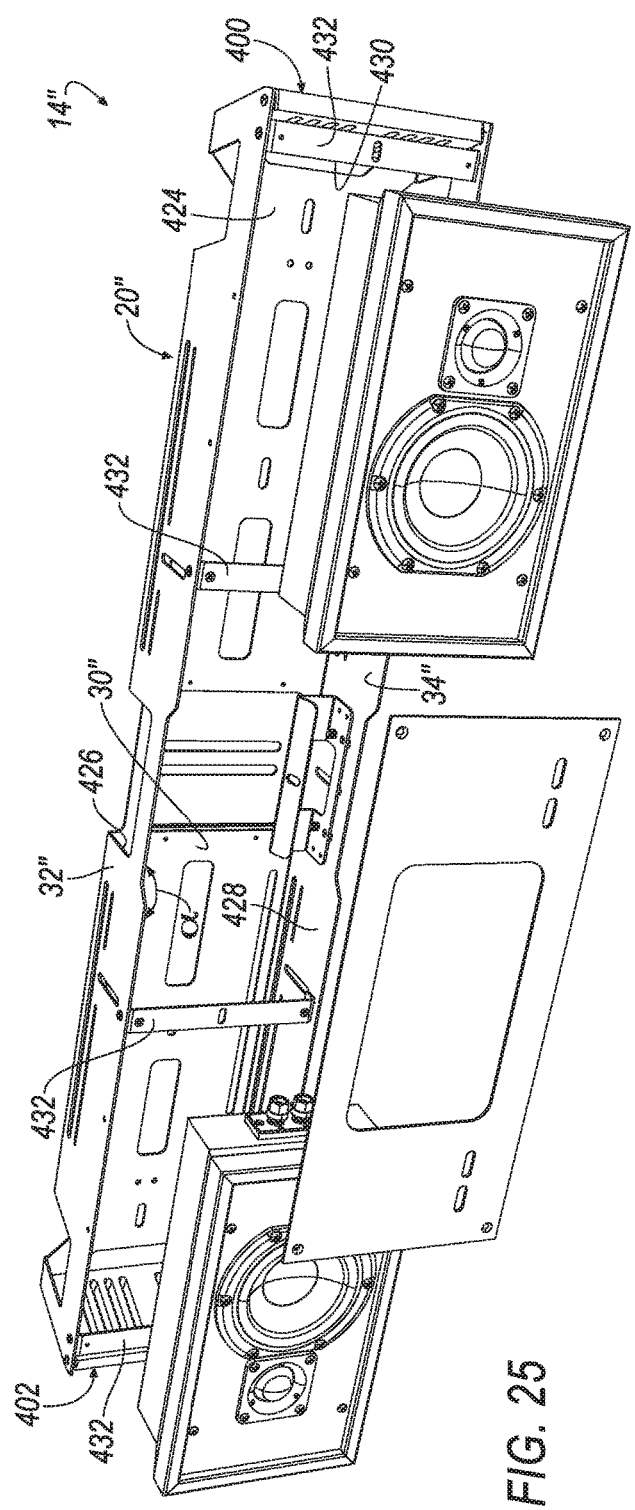
FIG. 25 is another embodiment of the component rack having pivotable doors.
Figure 29:
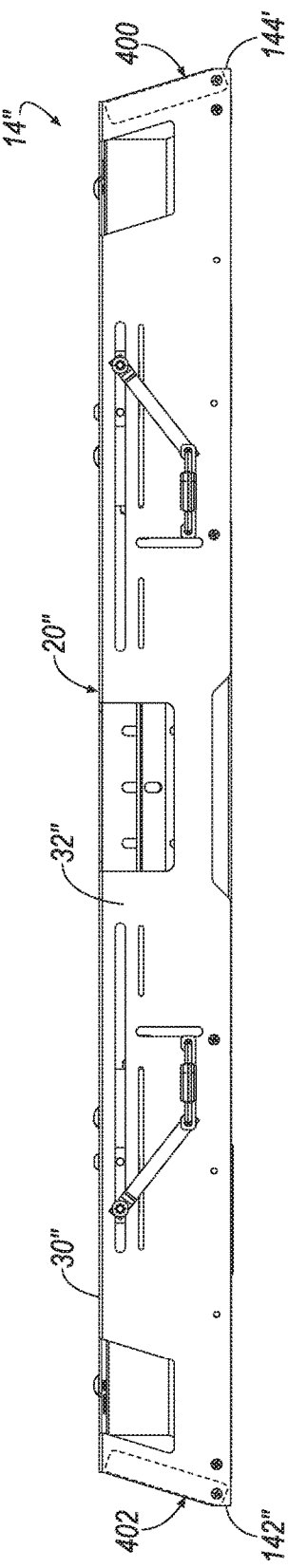
FIG. 29 is a top view of the component rack and rack mount shown in FIG. 26.
Figure 26:
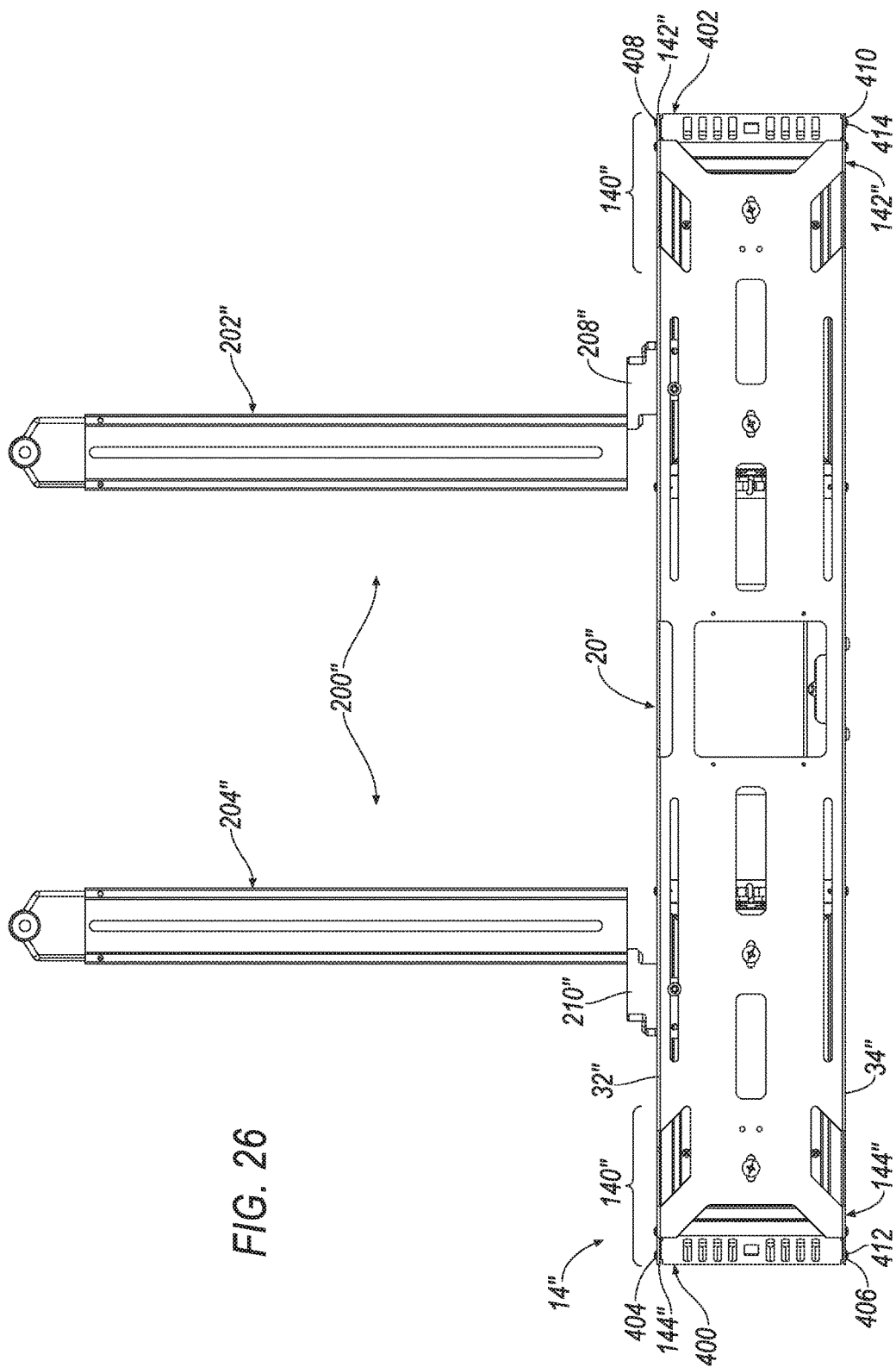
FIG. 26 is a rear view of the embodiment shown in FIG. 25, illustrating an embodiment of a rack mount.
Figure 27:
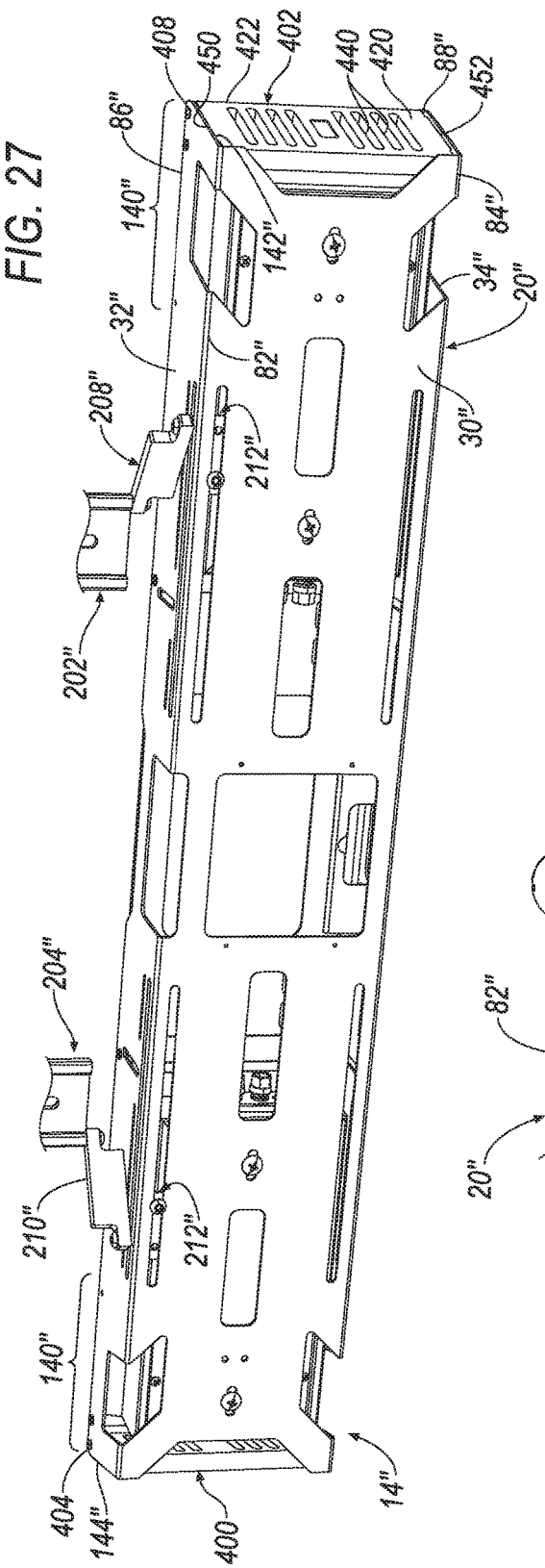
FIG. 27 is a rear perspective view of the component rack shown in FIG. 25.
Figure 28:
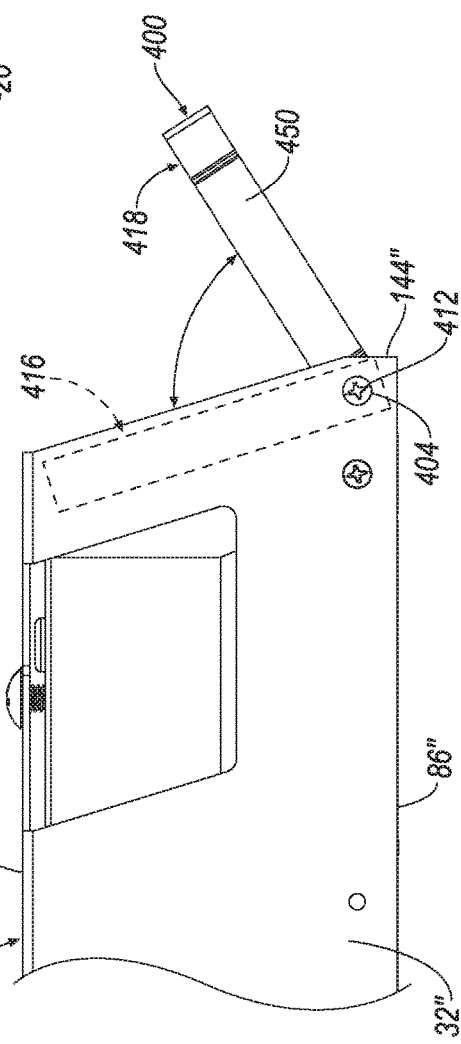
FIG. 28 is a partial top view of the component rack shown in FIG. 25, illustrating an exemplary pivotable door.
Figure 30:
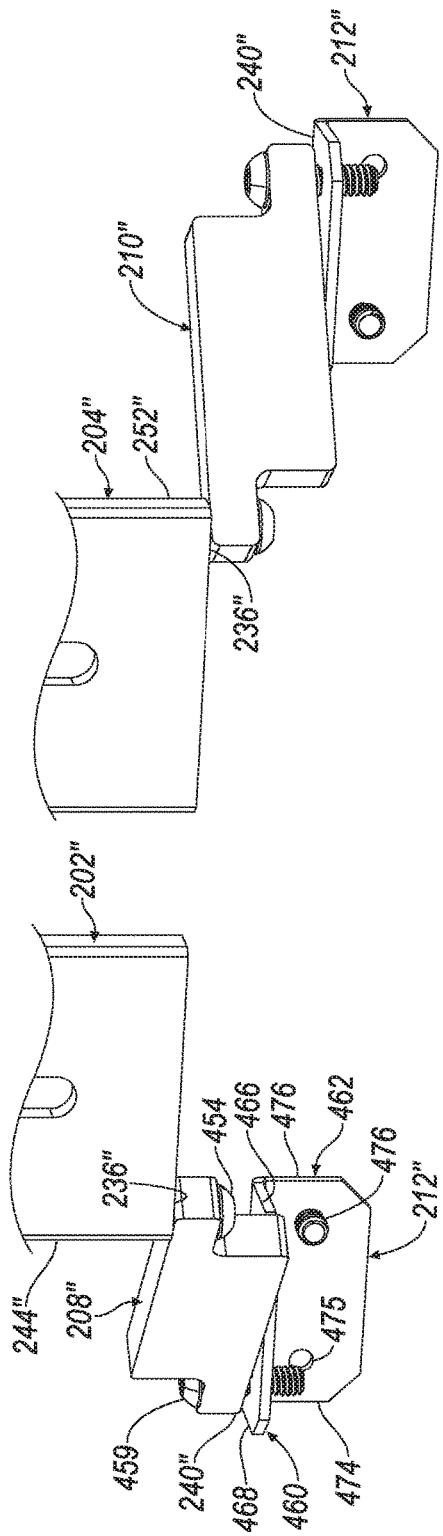
FIG. 30 is an enlarged partial perspective view of a portion of the rack mount shown in FIG. 26.
Figure 31:
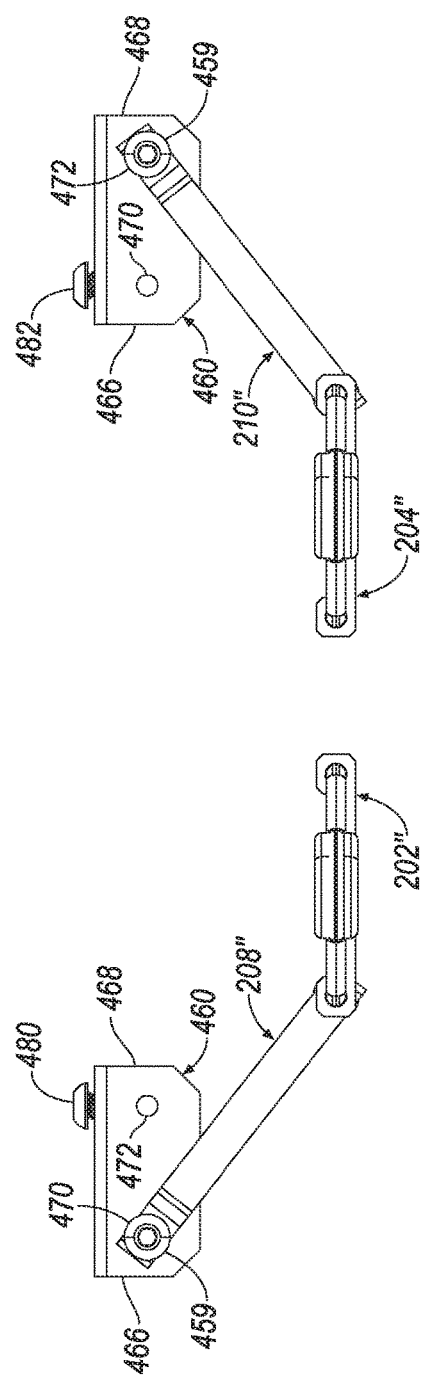
FIG. 31 is a top view of the rack mount shown in FIG. 26.

FIG. 24 illustrates yet another embodiment of the component rack 14. For example, in at least one embodiment, the mesh 172 of the grill 26 generally may be adapted to block light—e.g., lights associated with the electronics devices 28 therein, which may or may not be flashing. In this manner, the grill 26 inhibits the passage of light therethrough which otherwise may be viewable by the user and become a nuisance—e.g., while the user watches television 12 (not shown here). In at least one embodiment, the mesh 172 includes a plurality of predetermined pass-through regions 300 which may be at least partially transparent—i.e., regions 300 do not inhibit the passage of visible or invisible light or at least inhibit it to a lesser degree. In this manner, the regions 300 may permit signaling between sensors within the chamber region 50 and other devices. One such example of the pass-through regions 300 is illustrated in FIG. 24; here, the regions 300 are adapted to permit communication with IR repeaters within the chamber region 50 (e.g., so that a remote control may be operative with the television 12 or other electronic device 28). Of course, regions 300 of the mesh 172 may correspond to the holes 132 in the front plate 22 to facilitate this or other communication. The illustrated regions 300 are merely one example; other implementations also exist.

FIGS. 25-29 illustrate another exemplary embodiment of the component rack (e.g., a component rack 14") having one or more pivotable doors 400, 402 (e.g., instead of respective end walls 36, 38). For example, each distal end 140" of the frame 20" may comprise a pair of pivotal holes 404-406, 408-410 adapted to carry the respective doors 400, 402 via fastener(s) 412, 414, respectively. For example, near (within 1-2 inches) the axial end 144", hole 404 may be located in the upper wall 32", and near (within 1-2 inches) the axial end 144", hole 406 may be located lower wall 34". Holes 408-410 may be similarly located at the near axial end 142". In at least one example, holes 404-410 are located nearer corresponding front edges 86", 88" than corresponding rear edges 82", 84". In this manner, when the respective door is pivoted from a closed position 416 to an open position 418, the respective door 400, 402 hides loudspeaker or other electronic components therein from a user facing the front of the component rack 14". Further, the doors 400, 402 may be moved to the open position to provide additional ventilation of the loudspeaker(s), electronic components, etc.

In at least one example, each door 400, 402 may be identical; therefore, only one will be described. According to one example, door 402 may comprise a flat body 420 having any suitable shape. In at least one example, the shape and size of body 420 (e.g., and more particularly, of a periphery 422 thereof) may be defined by the frame 20" (e.g., defined by the corresponding inner surfaces 424, 426, 428, 430 of base 30", upper wall 32", lower wall 34", and support 432, respectively (or of the flange-like coupling features 100, 102, described above)) (see FIGS. 6, 25). Thus, in the illustrated example, the periphery 422 may be rectangular—having any suitable thickness. In at least one example, within periphery 422, the body 420 comprises one or more slots 440—e.g., for cooling components such as loudspeakers or other electronics within the frame 20"; however, these are not required.

Opposite ends 450, 452 of door 400 (and/or door 402) may comprise an axially aligned pair of blind holes (hidden) (or single through-hole) sized to receive respective fasteners 412, 414 thereby hinge-ably coupling the respective door to frame 20". Any suitable fastener(s) may be used (e.g., including pins, rods, bolts, screws, etc.) to carry each door 400, 402. In at least one example, the frame 20" is comprised of power-coated or painted metal (e.g., such as steel or aluminum), while the doors 400, 402 are comprised of natural or synthetic wood. Other suitable techniques could be used to support the pivotable doors 400, 402 instead; fasteners 412, 414 are merely examples.

FIGS. 26-27 and 29-31 illustrate another example of a rack mount (e.g., a rack mount 200"). As described below, each member 202", 204", of mount 200" may include a single leg and a single foot. The members 202", 204" may be identical (or reverse images of one another); therefore, only one will be described herein. Mount 200"—and more particularly, members 202", 204"—are adapted to be coupled to the back of display 12 (as described above) and also configured to locate the television 12 and component rack 14" closer to the building wall upon which the television is mounted. Other features of rack mount 200" may be identical to those described above; therefore, they will not re-described here.

Recall that members 202, 204 (described above) include an inboard leg and an outboard leg—i.e., wherein the inboard leg (210) of member 202 was nearest the inboard leg (208) of member 204. Similarly, member 202 comprised an outboard leg (208), and member 204 comprised an outboard leg (210)—e.g., see FIG. 14. In the instant example, members 202", 204" each may have only one leg—outboard legs 208", 210", respectively. For example, leg 208" may be coupled to member 202" at first joint 236" near lateral side 244", and leg 210" may be coupled to member 204" at corresponding first joint 236" near lateral side 252". First joint 236" may comprise a fastener 454 coupling leg 208" to member 202". In other examples, members 202", 204" could each have inboard legs instead; or e.g., each member 202", 204" could have both inboard and outboard legs (e.g., two legs each, as previously described).

Each leg 208", 210" may have a single foot 212", and a respective foot 212"—which is coupled to each leg 208", 210" via respective second joints 240" using a fastener 459—may be identical. Foot 212" may have an upper element 460 and a lower element 462 coupled to one another to form an L-shape (e.g., being an L-shaped bracket). In at least one example, the upper and lower elements 460, 462 are adjoined at a right angle—that corresponds with an inner angle α of the frame 20" (see also FIG. 25). Angle α may be defined as an angle formed by upper wall 32" and base 30". Of course, non-right angles α could be used instead.

Between ends 466, 468 of upper element 460, element 460 may have at least one hole 470, 472 (e.g., two are shown). Similarly, between ends 474, 476 of lower element 462, element 462 may have at least one hole 475, 476 (e.g., again, two are shown). In at least the illustrated example, hole 470 may be used to form coupling joint 240" (pivotally coupling foot 212" and leg 208"), and hole 472 may be used to form corresponding coupling joint 240" (pivotally coupling foot 212" to leg 210").

Rack mount 200" may carry component rack 14" by locating the feet 212 within the cavity 40"—e.g., more particularly, within angle α. One or more fasteners 480, 482 may be used to couple the feet 212" to mounting slots 54" (e.g., within the base 30"). As the feet 212" are located inside the cavity 40", the base 30" of the component rack 14" may be located closer to the building wall upon which the television 12 is mounted (e.g., closer than the example shown in FIGS. 14-15), thereby presenting a more aesthetic appearance to the user.

Fasteners 454, 459, 480, 482, etc. may comprise any suitable fasteners. Non-limiting examples include machine screws, pins, clips, clamps, etc. Further, first joints 236, 236" and second joints 240, 240" may permit 360-degree rotational freedom—thereby permitting component rack 14" to be mounted to televisions 12 having varying configurations, using differing television wall mounts, or having differing mounting schemes. Consequently, leg 208 (or 208") may pivot up to 360° with respect to member 202 (or 202", respectively), leg 210 (or 210") may pivot up to 360° with respect to member 204 (or 204", respectively), foot 214 may pivot up to 360° with respect to leg 210, and foot 212 (or 212") may pivot up to 360° with respect to leg 208, 208", or 210", respectively.

The features of component rack 14, 14', and/or 14" may be used interchangeably with one another. For example, the hinged front plate 22 of rack 14 may be used with rack 14' or 14". Similarly, the doors 400, 402 of rack 14" could be used with the axially-slide-able component modules 14'. Further, rack mount 200 or mount 200" could be used with any of frames 20, 20', 20". These are merely examples. Other combinations are also possible.

Thus, there has been described a component rack for a television. The component rack includes a frame, a front plate, a grill, and one or more component modules—the rack being designed to carry modular electronic devices or components. In a preferred embodiment, the component rack has a minimalist configuration. For example, in one implementation, only the grill is viewable by the user of the television, and the component rack appears to be part of the television itself. In another implementation, the grill includes an aperture revealing a camera carried within the frame that enables video conferencing with compatible television systems (and other parts of the rack are hidden from the user's view). In general, the component rack is configured to simplify installation, as well as maintenance or upgrades. The component modules (e.g., which may be loudspeaker assemblies) may be removed from the front of the rack in one embodiment and from the sides or ends in another embodiment. And the modular electronic devices within the frame may be accessed by removal of the grill and front plate. Alternatively, in one embodiment, the front plate may be opened via a hinged element to a 90-degree angle and serve as a platform for a service technician.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A component rack for a display, comprising:
    a frame, comprising:
        a base;
        a first wall coupled to and extending from the base to a first front edge; and
        a second wall coupled to and extending from the base to a second front edge, wherein the first wall comprises a first coupling feature that is coupled to and extending from the first front edge toward the second wall;
        wherein the base, the first wall, and the second wall are arranged to form a U-shaped cavity and each of the base, the first wall, and the second wall extend along a longitudinal axis, wherein the cavity is open at opposite axial ends of the base, the first wall, and the second wall; and
    at least two component modules located within the cavity and adapted to be coupled to the frame, wherein the frame and a respective inboard side of each of the at least two component modules define an electronics chamber region, wherein the frame is adapted to carry modular electronic devices,
    wherein the at least two component modules are axially displaceable with respect to the frame;
    a front plate that is coupled to the first and second walls in a closed position thereby enclosing the electronics chamber region; and
    a rack mount comprising: a first member and a second member couplable to a rear face of the display, wherein each of the first and second members, comprise:
a telescopic rail; at least one leg; and at least one foot coupled to the frame,
wherein the rail, the at least one leg, and the at least one foot are independently pivotable with respect to another.

2. The component rack of claim 1, wherein the at least two component modules are loudspeaker assemblies.

3. The component rack of claim 1, wherein the at least two component modules are slide-ably coupled to the base.

4. The component rack of claim 1, wherein the front plate is:
coupled to the first coupling feature,
coupled to a second coupling feature that is coupled to and extending from the second front edge,
or coupled to both.

5. The component rack of claim 1, wherein the front plate is coupled to the second wall with a 90-degree hinging element, wherein, when the front plate is in an open position, the front plate extends radially-outwardly of the frame providing a workspace platform.

6. The component rack of claim 1, wherein the base is adapted to be mounted to a wall.

7. The component rack of claim 1, further comprising a grill, wherein the front plate further comprises an aperture,
wherein the grill is coupled to the frame,
wherein the grill comprises a light-blocking mesh,
wherein the mesh comprises at least one pass-through region which is more transparent than a remainder of the mesh,
wherein a location of the at least one pass-through region corresponds with a location of the aperture in the front plate.

8. The component rack of claim 1, wherein the at least one foot comprises an L-shaped bracket.

9. The component rack of claim 1, wherein the first coupling feature is a flange.

10. The component rack of claim 1, wherein the first coupling feature is a strut that extends from the first front edge to the second front edge.

11. A component rack for a display, comprising: a frame, comprising: a base; a first wall coupled to and extending from the base; and a second wall coupled to and extending from the base, wherein the base, the first wall, and the second wall are arranged to form a U-shaped cavity and each of the base, the first wall, and the second wall extend along a longitudinal axis, wherein the cavity is open at opposite axial ends of the base, the first wall, and the second wall; at least two component modules located within the cavity and adapted to be coupled to the frame, wherein the frame and a respective inboard side of each of the at least two component modules define an electronics chamber region, wherein the frame is adapted to carry modular electronic devices, wherein the at least two component modules are axially displaceable with respect to the frame; a front plate that is coupled to the second wall via a hinge element and that is couplable to the first wall in a closed position, wherein, in the closed position, the front plate encloses the electronics chamber region, wherein, in a fully open position, the front plate extends outwardly from the frame substantially parallel the second wall to provide a workspace platform for an installer; and a rack mount comprising: a first member and a second member couplable to a rear face of the display, wherein each of the first and second members, comprise: a telescopic rail; at least one leg; and at least one foot coupled to the frame, wherein the rail, the at least one leg, and the at least one foot are independently pivotable with respect to another.

12. The component rack of claim 11, wherein the at least two component modules are loudspeaker assemblies.

13. The component rack of claim 11, wherein the at least two component modules are slide-ably coupled to the base.

14. The component rack of claim 11, wherein the first wall further comprises a coupling feature extending from a front edge of the first wall toward the second wall, wherein, when the front plate is in the closed position, the front plate is fasten-able to the coupling feature.

15. The component rack of claim 14, wherein the coupling feature is a flange.

16. The component rack of claim 14, wherein the coupling feature is a strut that extends from the front edge of the first wall toward the second wall.

17. The component rack of claim 11, further comprising a grill,
wherein the front plate further comprises an aperture,
wherein the grill is coupled to the frame and covers the front plate,
wherein the grill comprises a light-blocking mesh,
wherein the mesh comprises at least one pass-through region which is more transparent than a remainder of the mesh,
wherein a location of the at least one pass-through region corresponds with a location of the aperture in the front plate.

18. The component rack of claim 11, wherein the at least one foot comprises an L-shaped bracket.

19. The component rack of claim 1, wherein the front plate is coupled to the first or second walls via a hinging element, one or more fastening devices, or both.

* * * * *